US012649300B2

(12) United States Patent
Kagumba et al.

(10) Patent No.: US 12,649,300 B2
(45) Date of Patent: Jun. 9, 2026

(54) HIGH-TEMPERATURE, THERMALLY-INSULATIVE LAMINATES INCLUDING AEROGEL LAYERS

(71) Applicant: Blueshift Materials, Inc., Spencer, MA (US)

(72) Inventors: Lawino Kagumba, Spencer, MA (US); Marisa Snapp-Leo, Spencer, MA (US); Garrett Poe, Spencer, MA (US)

(73) Assignee: BLUESHIFT MATERIALS, INC., Spencer, MA (US)

(*) Notice: Subject to any disclaimer, the term of this patent is extended or adjusted under 35 U.S.C. 154(b) by 74 days.

(21) Appl. No.: 17/998,340

(22) PCT Filed: May 17, 2021

(86) PCT No.: PCT/US2021/032718

§ 371 (c)(1),
(2) Date: Nov. 9, 2022

(87) PCT Pub. No.: WO2021/231998

PCT Pub. Date: Nov. 18, 2021

(65) Prior Publication Data

US 2023/0226805 A1 Jul. 20, 2023

Related U.S. Application Data

(60) Provisional application No. 63/025,953, filed on May 15, 2020.

(51) Int. Cl.
*B32B 15/08* (2006.01)
*B32B 7/12* (2006.01)
(Continued)

(52) U.S. Cl.
CPC ................ *B32B 15/08* (2013.01); *B32B 7/12* (2013.01); *B32B 9/007* (2013.01); *B32B 9/045* (2013.01);
(Continued)

(58) Field of Classification Search
CPC ....... B32B 15/08; B32B 15/046; B32B 9/007; B32B 9/045; B32B 9/046;
(Continued)

(56) References Cited

U.S. PATENT DOCUMENTS

| | | | | |
|---|---|---|---|---|
| 9,963,571 | B2 | 5/2018 | Sakaguchi et al. | |
| 2007/0184229 | A1 * | 8/2007 | Jeong ...................... | B32B 27/14 428/40.1 |

(Continued)

FOREIGN PATENT DOCUMENTS

| | | |
|---|---|---|
| CN | 105189104 | 12/2015 |
| CN | 107206736 | 9/2017 |

(Continued)

OTHER PUBLICATIONS

International Search Report and Written Opinion issued in International Application No. PCT/US2021/032718, dated May 17, 2021.

(Continued)

*Primary Examiner* — Joanna Pleszczynska
(74) *Attorney, Agent, or Firm* — NORTON ROSE FULBRIGHT US LLP

(57) ABSTRACT

This disclosure includes high-temperature, thermally-insulative laminates, Some laminates have a front surface, a back surface, one or more heat-dispersing layers, each comprising at least 90% by weight of: a metal having a melting point of at least 1,300° C. and a thermal conductivity of at least 15 W/Km; or graphite, and one or more heat-insulating layers coupled to the heat-dispersing layer(s), the heat-insulating layer(s) each including a layer of polymeric aerogel, wherein (Continued)

at least a majority of the front surface is defined by one of the heat-dispersing layer(s).

25 Claims, 6 Drawing Sheets

(51) Int. Cl.
*B32B 9/00* (2006.01)
*B32B 9/04* (2006.01)
*B32B 15/04* (2006.01)

(52) U.S. Cl.
CPC ............ *B32B 9/046* (2013.01); *B32B 15/046* (2013.01); *B32B 2266/0214* (2013.01); *B32B 2266/126* (2016.11); *B32B 2305/022* (2013.01); *B32B 2307/302* (2013.01); *B32B 2307/304* (2013.01); *B32B 2307/308* (2013.01)

(58) Field of Classification Search
CPC ...... B32B 2266/126; B32B 2266/0214; B32B 2305/022; B32B 2307/304
See application file for complete search history.

(56) References Cited

U.S. PATENT DOCUMENTS

| | | | | |
|---|---|---|---|---|
| 2009/0029147 | A1 | 1/2009 | Tang et al. | |
| 2009/0145347 | A1* | 6/2009 | Nakamura | G01N 21/81 116/216 |
| 2011/0281060 | A1* | 11/2011 | Jorgensen | F16L 59/026 428/221 |
| 2014/0255642 | A1 | 9/2014 | White et al. | |
| 2014/0287641 | A1 | 9/2014 | Steiner, III | |
| 2017/0121483 | A1 | 5/2017 | Poe et al. | |
| 2017/0165946 | A1 | 6/2017 | Poupa Parsigneau et al. | |
| 2018/0250913 | A1 | 9/2018 | Kotake et al. | |

FOREIGN PATENT DOCUMENTS

| | | |
|---|---|---|
| CN | 110944744 | 3/2020 |
| EP | 3251830 | 12/2017 |
| WO | WO 2014/189560 | 11/2014 |
| WO | WO 2016/121757 | 8/2016 |
| WO | WO 2017/078888 | 5/2017 |
| WO | WO 2018/078512 | 5/2018 |
| WO | WO 2018/140804 | 8/2018 |
| WO | WO 2018/200827 | 11/2018 |
| WO | WO 2019/006184 | 1/2019 |
| WO | WO 2019/210094 | 10/2019 |
| WO | WO 2019/216869 | 11/2019 |

OTHER PUBLICATIONS

Office Action issued in corresponding European Application No. 21732626.3, dated Jul. 30, 2025.

Office Action issued in corresponding Japanese Application No. 2022-569042, dated Jan. 22, 2026 (English Translation provided).

Office Action and Search Report issued in corresponding Chinese Application No. 202180045949.1, dated Mar. 19, 2025 (English Translation provided).

* cited by examiner

HIGH-TEMPERATURE, THERMALLY-INSULATIVE LAMINATES INCLUDING AEROGEL LAYERS

CROSS REFERENCE TO RELATED APPLICATIONS

This application is a national phase application under 35 U.S.C. § 371 of International Application No. PCT/US2021/032718, filed May 17, 2021, which claims the benefit priority to U.S. Provisional Application No. 63/025,953 filed May 15, 2020, the contents of which are incorporated herein in their entirety and without disclaimer.

BACKGROUND OF THE INVENTION

A. Field of the Invention

The present invention relates generally to thermally-insulative materials for use in high-temperature (e.g., 1,000° C. and hotter) environments, and more specifically but not by way of limitation, to such materials that are flexible (e.g., capable of being disposed in a roll) and/or thin (e.g., having a thickness that is between 6 thousandths of an inch (mil) and 125 mil).

B. Description of Related Art

It is often desired to protect components from and/or insulate high-temperature environments. Traditionally, a ceramic fiber-based material is used, such as one including fiberglass, silica fibers, alumina fibers, and/or the like, which can be disposed around components within the high-temperature environment, used to line the high-temperature environment, and/or the like. Such a material, however, can be relatively brittle, inflexible, and subject to cracking, which reduces its effectiveness.

SUMMARY OF THE INVENTION

Aerogels are another material that can be used for thermal insulation and, in contrast to materials like those described above, can be relatively flexible. But when aerogels are exposed to a high-temperature (e.g., 1,000° C. or hotter) environment, such as to a flame, aerogels may burn or char, shortening their useful life. Some of the present laminates nevertheless allow the use of one or more aerogel layers as thermal insulation in such a high-temperature environment, at least by including one or more heat-dispersing layer(s), each comprising a high-temperature-resistant and thermally-conductive material, that can help shield the aerogel layer(s) from the high-temperature environment. Such heat-dispersing layer(s) can, for example, mitigate the development of hot spots along the aerogel layer(s)—and attendant burning or charring of the aerogel layer(s)—by spreading heat from the environment along the laminate. A suitable high-temperature-resistant and thermally-conductive material can be, for example, graphite or a metal having: (1) a melting point of at least 1,300° C. (e.g., at least 1,600° C., at least 1,900° C., at least 2,200° C., at least 2,400° C., at least 2,700° C., at least 3,000° C., or at least 3,300° C.); and (2) a thermal conductivity of at least 15 W/Km (e.g., at least 30 W/Km, at least 40 W/Km, at least 50 W/Km, at least 75 W/Km, at least 100 W/Km, at least 125 W/Km, at least 150 W/Km, or at least 175 W/Km).

Some of the present laminates can also be relatively thin, thereby enhancing their usability. To illustrate, in some laminates, each of the heat-dispersing layer(s) can have a thickness that is between 1.0 mils and 10.0 mils (e.g., between 1.0 mils and 5.0 mils or approximately 2.0 mils), and each of the aerogel layer(s) can have a thickness that is between 1.5 mils and 800 mils (e.g., between 1.5 mils and 400 mils, between 1.5 mils and 200 mils, between 1.5 mils and 80 mils, between 1.5 mils and 40 mils, between 1.5 and 20 mils, between 1.5 mils and 10 mils, between 1.5 and 7.0 mils, between 3.0 mils and 7.0 mils, approximately 6.5 mils, or approximately 5.0 mils). To further illustrate, such a laminate can have a total thickness that is between 6.0 mils and 150 mils (e.g., between 6.0 mils and 75 mils, between 6.0 mils and 50 mils, or between 6.0 mils and 25 mils). In some laminates, each of the aerogel layer(s) can have a thermal conductivity that is between 0.001 to 0.5 W/mK, between 0.005 to 0.2 W/mK, between 0.01 to 0.1 W/mK, between 0.01 to 0.5 W/mK, or approximately 0.03 W/mK, measured using a Netzsch HFM 436/3/1E Lamda per ASTM C518-10, steady state thermal transmission through flat slab specimens using a heat flow meter apparatus.

Further enhancing their usability, some of the present laminates can be relatively flexible. For example, some laminates are capable of being disposed in a roll having an inner diameter of less than or equal to 10 cm (e.g., less than or equal to 8 cm, 5 cm, 4 cm, 2 cm, or 1 cm) without suffering permanent deformation. Such flexibility—even if not rising to the level of this example—can be provided by the materials of a laminate's heat-dispersing, aerogel, and other (if present) layers and/or the relatively small thicknesses of those layers (e.g., those discussed above).

Some of the present laminates comprise: a front surface, a back surface, one or more heat-dispersing layers, each comprising at least 90% by weight of: a metal having a melting point of at least 1,300° C. and a thermal conductivity of at least 15 W/Km; or graphite, and one or more heat-insulating layers coupled to the heat-dispersing layer(s), wherein at least a majority of the front surface is defined by one of the heat-dispersing layer(s). In some laminates, the heat-dispersing layer(s) comprise two or more heat-dispersing layers, at least a majority of the front surface of the laminate is defined by a first one of the heat-dispersing layer(s), and at least a majority of the back surface of the laminate is defined by a second one of the heat-dispersing layer(s). In some laminates, the heat-insulating layer(s) comprise two or more heat-insulating layer(s), and none of the heat-dispersing layer(s) is disposed between adjacent ones of the heat-insulating layer(s).

In some laminates, at least one of the heat-dispersing layer(s) comprises at least 90% by weight of the metal. In some laminates, the melting point of the metal is at least 1,600° C., at least 1,900° C., at least 2,200° C., at least 2,400° C., at least 2,700° C., at least 3,000° C., or at least 3,300° C. In some laminates, the melting point of the metal is less than 3,800° C. or less than 3,600° C. In some laminates, the thermal conductivity of the metal is greater than 15 W/Km, greater than 30 W/Km, greater than 40 W/Km, greater than 50 W/Km, greater than 75 W/Km, greater than 100 W/Km, greater than 125 W/Km, greater than 150 W/Km, or greater than 175 W/Km. In some laminates, the thermal conductivity of the metal is less than 200 W/Km. In some laminates, the metal comprises molybdenum, tungsten, rhenium, tantalum, niobium, stainless steel, or an alloy thereof.

In some laminates, at least one of the heat-dispersing layer(s) comprises at least 90% by weight of graphite.

In some laminates, at least one of the heat-dispersing layer(s) has a thickness that is between 1.0 and 10.0 mils or between 1.0 and 5.0 mils. In some laminates, at least one of the heat-dispersing layer(s) has a thickness of approximately 2.0 mils.

In some aspects, at least one of the heat-insulating layer(s), can contain a porous material. In some aspects, the heat-insulating layer(s) each can independently contain a porous material. In certain aspects, the porous material can be an open celled porous material. In certain other aspects, the porous material can be a closed celled porous material. In certain aspects, the porous material can be a foam. In certain aspects, the foam can be an organic or silicone foam. Non-limiting examples of the organic foam can include polyurethane, polystyrene, polyvinyl chloride, (meth)acrylic polymer, polyamide, polyimide, polyaramide, polyurea, polyester, polyolefin (such as polyethylene, polypropylene, ethylene propylene diene monomer (EPDM) foam, or the like), polyethylene terephthalate, polybutylene terephthalate, polyvinyl chloride, polyvinyl acetate, ethyl vinyl alcohol (EVOH), ethylene-vinyl acetate (EVA), polymethyl methacrylates, polyacrylates, polycarbonates, polysulphonates, or synthetic rubber foam, or any combinations thereof. In certain aspects, the foam can be a polyurethane foam. In certain aspects, the porous material can be an aerogel. In some laminates, the heat-insulating layer(s) each can comprise a layer of polymeric aerogel. In some laminates, for at least one of the heat-insulating layer(s), the layer of polymeric aerogel comprises an open-cell structure. In some laminates, for at least one of the heat-insulating layer(s), the layer of polymeric aerogel comprises micropores, mesopores, and/or macropores. In some laminates, for at least one of the heat-insulating layer(s), the layer of polymeric aerogel has a pore volume, and at least 10%, at least 50%, at least 75%, or at least 95% of the pore volume is made up of micropores. In some laminates, for at least one of the heat-insulating layer(s), the layer of polymeric aerogel has a pore volume, and at least 10%, at least 50%, at least 75%, or at least 95% of the pore volume is made up of mesopores. In some laminates, for at least one of the heat-insulating layer(s), the layer of polymeric aerogel has a pore volume, and at least 10%, at least 50%, at least 75%, or at least 95% of the pore volume is made up of macropores. In some laminates, for at least one of the heat-insulating layer(s), the layer of polymeric aerogel has a pore volume, and at least 10%, at least 50%, at least 75%, or at least 95% of the pore volume is made up of micropores and/or mesopores. In some laminates, for at least one of the heat-insulating layer(s), the layer of polymeric aerogel has an average pore diameter that is between 2.0 nm and 50 nm. In some laminates, for at least one of the heat-insulating layer(s), the layer of polymeric aerogel has an average pore diameter that is between 50 nm and 5,000 nm. In some laminates, the average pore diameter is between 100 nm and 800 nm, between 100 nm and 500 nm, between 150 nm and 400 nm, between 200 nm and 300 nm, or between 225 nm and 275 nm.

In some laminates, for at least one of the heat-insulating layer(s), the layer of polymeric aerogel comprises at least 90% by weight of an organic polymer. In some laminates, for at least one of the heat-insulating layer(s), the layer of polymeric aerogel comprises at least 90% by weight of polyimide, polyamide, polyaramid, polyurethane, polyurea, polyester, or a blend thereof. In some laminates, for at least one of the heat-insulating layer(s), the layer of polymeric aerogel comprises at least 90% by weight of polyimide.

In some aspects, at least one or more of the heat-insulating layer(s) can comprise fibers without a porous material of the present invention. In other aspects, at least one or more of the heat-insulating layer(s) can comprise a combination of fibers with a porous material of the present invention (e.g., fibers dispersed or aligned within a porous material). The fibers can be natural, synthetic, semi-synthetic fibers, or combinations thereof. The fibers can comprise vegetable, wood, animal, mineral, biological fibers, or combinations thereof. In some particular instances, the fibers can comprise rayon, bamboo, diacetate, triacetate fibers, polyester fibers, aramid fibers, or combinations thereof. In some embodiments, the fibers comprise metal fibers, carbon fibers, carbide fibers, glass fibers, mineral fibers, basalt fibers, or combinations thereof. In some embodiments, the fibers comprise thermoplastic polymer fibers, thermoset polymer fibers, or combinations thereof. Non-limiting examples of thermoplastic fibers includes fibers of polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly(cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. Non-limiting examples of thermoset fibers include a fiber of unsaturated polyester resins, polyurethanes, polyoxybenzylmethylenglycolanhydride (e.g., bakelite), urea-formaldehyde, diallyl-phthalate, epoxy resin, epoxy vinylesters, polyimides, cyanate esters of polycyanurates, dicyclopentadiene, phenolics, benzoxazines, co-polymers thereof, or blends thereof. In some embodiments, the fibers are polyaramid, polyimide, polybenzoxazole, polyurethane, or blends thereof. In some embodiments, the fibers are vinylon. In some embodiments, the fibers are polyester fibers. In some embodiments, the fibers are non-woven. In some embodiments, the fibers form a fiber matrix. In some embodiments, the fibers have an average filament cross sectional area of 5 $\mu m^2$ to 40,000 $\mu m^2$ and an average length of 20 mm to 100 mm. In some embodiments, the cross sectional area is 5, 10, 15, 20, 25, 50, 100, 150, 200, 250, 300, 350, 400, 450, or 500 $\mu m^2$ or between any two of those values. In some embodiments, the fibers have an average length of approximately 0.1, 0.2, 0.3, 0.4, 0.5, 1, 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000, 3000, 4000, 5000 mm or between any two of those values. Bundles of various kinds of fibers can be used depending on the use intended for the internally reinforced aerogel. For example, the bundles may be of carbon fibers or ceramic fibers, or of fibers that are precursors of carbon or ceramic, glass fibers, aramid fibers, or a mixture of different kinds of fiber. Bundles can include any number of fibers. For example, a bundle can include 400, 750, 800, 1375, 1000, 1500, 3000, 6000, 12000, 24000, 50000, or 60000 filaments. The fibers can have a filament diameter of 5 to 24 microns, 10 to 20 microns, or 12 to 15 microns or any range there between, or 5, 6, 7, 8, 9, 10, 11, 12, 13, 14, 15, 16, 17, 18, 19, 20, 21, 22, 23, 24 microns or any value there between. The fibers in a bundle of fibers can have an average filament cross sectional area of 7 $\mu m^2$ to 800 $\mu m^2$, which equates to an average diameter of 3 to 30 microns for circular fibers. In some embodiments, the fiber matrix comprises felt, batting, non-woven fabric, or a mat.

In some laminates, for at least one of the heat-insulating layer(s), the layer of polymeric aerogel has a thickness that is between 1.5 mils and 800 mils, between 1.5 mils and 400 mils, between 1.5 mils and 200 mils, between 1.5 mils and 80 mils, between 1.5 mils and 40 mils, between 1.5 and 20 mils, between 1.5 mils and 10 mils, between 1.5 mils and 7.0 mils, between 3.0 mils and 7.0 mils, approximately 6.5 mils, or approximately 5.0 mils; and/or has a thermal conductivity that is between 0.001 to 0.5 W/mK, between 0.005 to 0.2 W/mK, between 0.01 to 0.1 W/mK, between 0.01 to 0.5 W/mK, or approximately 0.03 W/mK, where the thermal conductivity is measured using a Netzsch HFM 436/3/1E Lamda per ASTM C518-10, steady state thermal transmission through flat slab specimens using a heat flow meter apparatus.

Some laminates comprise one or more adhesive layers, each disposed between adjacent ones of the heat-dispersing layer(s) and heat-insulating layer(s). In some laminates, at least one of the adhesive layer(s) comprises silicone. In some laminates, the silicone comprises polydimethyl silicone. In some laminates, the silicone comprises biphenyl silicone. In some laminates, at least one of the adhesive layer(s) has a thickness that is between 0.5 mils and 5.0 mils, between 0.5 mils and 3.0 mils, between 0.5 mils and 2.0 mils, or between 1.0 mil and 2.0 mils.

In some laminates, the laminate has a thickness that is between 6.0 mils and 150 mils, between 6.0 mils and 75 mils, between 6.0 mils and 50 mils, or between 6.0 mils and 25 mils.

In some laminates, the laminate can maintain mechanical integrity when exposed to a temperature of at least 800° C., at least 1,000° C., at least 1,300° C., at least 1,600° C., at least 1,900° C., or at least 2,200° C. for a time period of at least 30 s, at least 1 min, at least 1.5 min, or at least 2 min.

In some laminates, the laminate does not comprise fibers. In some laminates, the laminate does not comprise a ceramic.

In some laminates, the laminate is disposed in a roll such that a portion of the front surface of the laminate faces a portion of the back surface of the laminate. Some of the present apparatuses comprise: one of the present laminates, and, for at least one of the front surface and the back surface, a protective film removably disposed over the surface.

Some of the present methods comprise exposing one of the present laminates to a temperature of at least 800° C., at least 1,000° C., at least 1,300° C., at least 1,600° C., at least 1,900° C., or at least 2,200° C. for a time period of at least 30 s, at least 1 min, at least 1.5 min, or at least 2 min, wherein during the exposing, the laminate maintains mechanical integrity.

Also disclosed is a method of making a layer of polymeric aerogel suitable for use in at least some of the present laminates. The method can include: (a) providing a monomer or a combination of monomers to a solvent to form a solution; (b) polymerizing the monomer(s) in the solution to form a polymer gel matrix; and (c) subjecting the polymer gel matrix to conditions sufficient to remove liquid from the polymer gel matrix to form an aerogel having a polymeric matrix comprising an open-cell structure. Step (b) can further comprise adding a curing agent to the solution to reduce the solubility of polymers formed in the solution and to form macropores in the gel matrix, the formed macropores containing liquid from the solution. The process can include casting the polymer gel matrix in step (b) onto a support such that a layer of the polymeric gel matrix is comprised on the support, wherein the aerogel in step (c) is in the form of a film.

The aerogel's pore structure can be controlled, including the quantity and volume of macroporous, mesoporous, and microporous cells, primarily by controlling polymer/solvent dynamics during formation of the polymer gel matrix. As one example, a curing agent can be added to the solution in step (b) to reduce the solubility of polymers formed in the solution and to form macropores in the gel matrix, the formed macropores containing liquid from the solution. Such a curing agent can be, for example, 1,4-diazabicyclo[2.2.2]octane. Adding a curing agent to the solution in step (b) to instead improve the solubility of polymers formed in the solution, such as triethylamine, will form a relatively lower number of macropores in the gel matrix. In another example, when forming a polyimide aerogel, increasing the ratio of rigid amines (e.g., p-phenylenediamine (p-PDA)) to more flexible diamines (e.g., 4,4'-oxydianiline (4,4'-ODA)) in the polymer backbone can favor the formation of macropores as opposed to smaller mesopores and micropores.

While more specifics about monomers, solvents, and processing conditions are provided below, in general terms, the following can be adjusted to control the aerogel's pore structure: (1) the polymerization solvent; (2) the polymerization temperature; (3) the polymer molecular weight; (4) the molecular weight distribution; (5) the copolymer composition; (6) the amount of branching; (7) the amount of crosslinking; (8) the method of branching; (9) the method of crosslinking; (10) the method used in formation of the gel; (11) the type of catalyst used to form the gel; (12) the chemical composition of the catalyst used to form the gel; (13) the amount of the catalyst used to form the gel; (14) the temperature of gel formation; (15) the type of gas flowing over the material during gel formation; (16) the rate of gas flowing over the material during gel formation; (17) the pressure of the atmosphere during gel formation; (18) the removal of dissolved gasses during gel formation; (19) the presence of solid additives in the resin during gel formation; (20) the amount of time of the gel formation process; (21) the substrate used for gel formation; (22) the type of solvent or solvents used in each step of the optional solvent exchange process; (23) the composition of solvent or solvents used in each step of the optional solvent exchange process; (24) the amount of time used in each step of the optional solvent exchange process; (25) the dwell time of the part in each step of the solvent exchange process; (26) the rate of flow of the optional solvent exchange solvent; (27) the type of flow of the optional solvent exchange solvent; (28) the agitation rate of the optional solvent exchange solvent; (29) the temperature used in each step of the optional solvent exchange process; (30) the ratio of the volume of optional solvent exchange solvent to the volume of the part; (31) the method of drying; (32) the temperature of each step in the drying process; (33) the pressure in each step of the drying process; (34) the composition of the gas used in each step of the drying process; (35) the rate of gas flow during each step of the drying process; (36) the temperature of the gas during each step of the drying process; (37) the temperature of the part during each step of the drying process; (38) the presence of an enclosure around the part during each step of the drying process; (39) the type of enclosure surrounding the part during drying; and/or (40) the solvents used in each step of the drying process.

The term "aerogel" refers to a class of materials that are generally produced by forming a gel, removing a mobile interstitial solvent phase from the pores, and then replacing it with a gas or gas-like material. By controlling the gel and evaporation system, density, shrinkage, and pore collapse can be minimized. Aerogels of the present invention can include macropores, mesopores, and/or micropores. In preferred aspects, the majority (e.g., more than 50%) of the aerogel's pore volume can be made up of macropores. In other alternative aspects, the majority of the aerogel's pore volume can be made up of mesopores and/or micropores such that less than 50% of the aerogel's pore volume is made up of macropores. In some embodiments, the aerogels of the present invention can have low bulk densities (about 0.75 $g/cm^3$ or less, preferably about 0.01 $g/cm^3$ to about 0.5 $g/cm^3$), high surface areas (generally from about $m^2/g$ 10 to 1,000 $m^2/g$ and higher, preferably about 50 $m^2/g$ to about 1000 $m^2/g$), high porosities (about 20% and greater, preferably greater than about 85%), and/or relatively large pore volumes (more than about 0.3 mL/g, preferably about 1.2 mL/g and higher).

The presence of macropores, mesopores, and/or micropores in the aerogels of the present invention can be determined by mercury intrusion porosimetry (MIP) and/or gas physisorption experiments. The MIP test can be used to measure mesopores and macropores (i.e., American Standard Testing Method (ASTM) D4404-10, Standard Test Method for Determination of Pore Volume and Pore Volume Distribution of Soil and Rock by Mercury Intrusion Porosimetry). Gas physisorption experiments can be used to measure micropores (i.e., ASTM D1993-03(2008) Standard Test Method for Precipitated Silica—Surface Area by Multipoint BET Nitrogen).

The term "coupled" is defined as connected, although not necessarily directly, and not necessarily mechanically. Two items that are "coupled" may be unitary with each other or may be connected to one another via one or more intermediate components or elements.

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees, and substantially parallel includes parallel), as understood by a person of ordinary skill in the art. In any disclosed embodiment, the terms "substantially," "approximately," and "about" may be substituted with "within [a percentage] of" what is specified, where the percentage is 0.1, 1, 5, or 10%.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and containing") are open-ended linking verbs. As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any embodiment of any of the apparatuses and methods can consist of or consist essentially of—rather than comprise/have/include/contain—any of the described elements, features, and/or steps. Thus, in any of the claims, the phrase "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate identical structures. Rather, the same reference numbers may be used to indicate similar features or features with similar functionalities, as may non-identical reference numbers.

DETAILED DESCRIPTION

A. High-Temperature, Thermally-Insulative Laminates

Figure 1A:
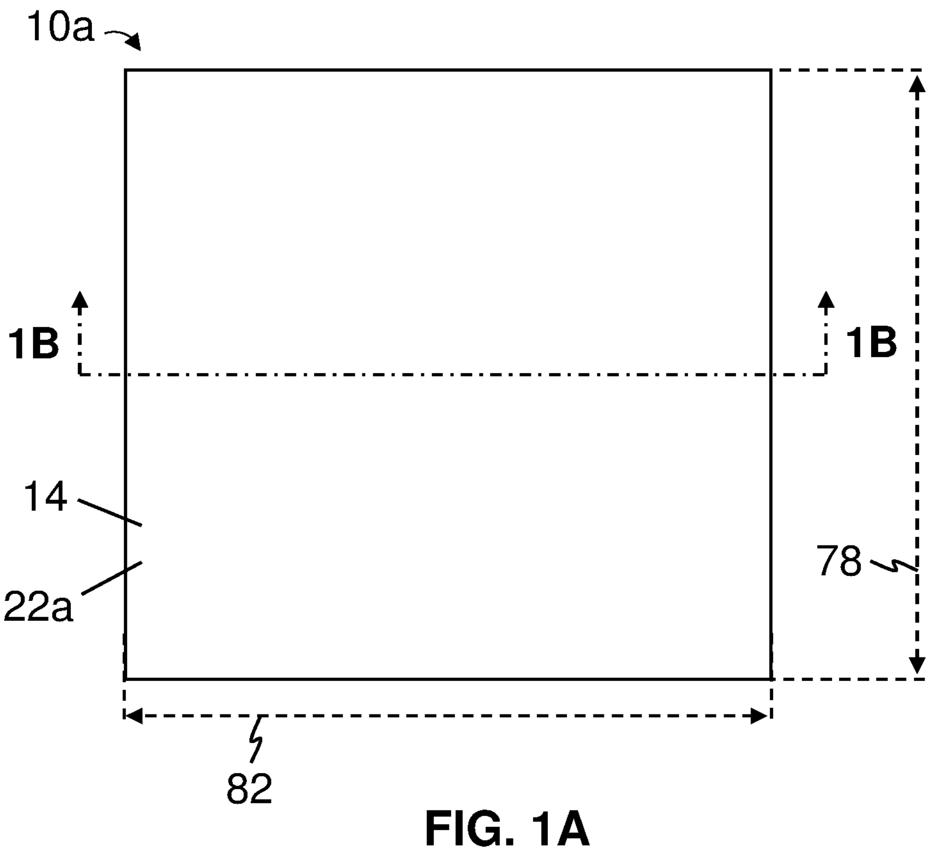
FIG. 1A is a top view of one of the present laminates that includes a heat-dispersing layer and three heat-insulating layers.
Figure 1B:
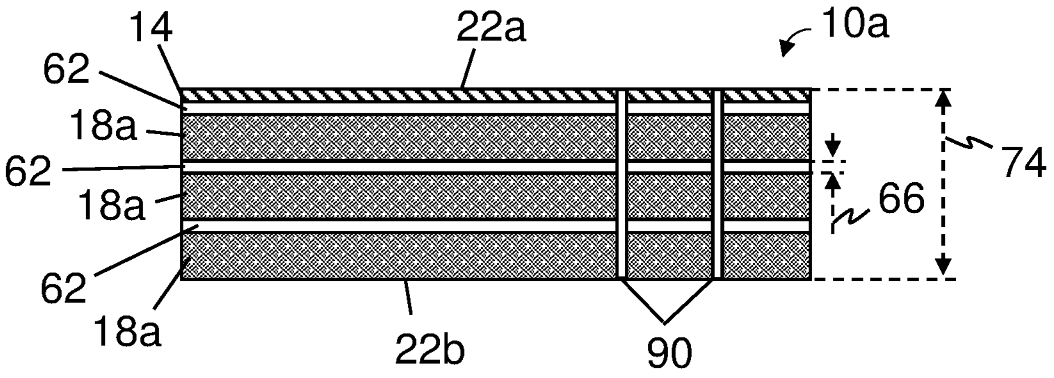
FIG. 1B is a cross-sectional side view of the laminate of FIG. 1A, taken along line 1B-1B of FIG. 1A.

Referring now to FIGS. 1A and 1B, shown is a first embodiment 10*a* of the present laminates. Laminate 10*a* includes a heat-dispersing layer 14 and three heat-insulating layers 18*a* coupled to the heat-dispersing layer. The present laminates can, however, include any suitable number of heat-dispersing layer(s) (e.g., 1, 2, 3, or more heat-dispersing layer(s)) and any suitable number of heat-insulating layer(s) (e.g., 1, 2, 3, 4, 5, 6, 7, 8, 9, or more heat-insulating layer(s)). In general, the heat-dispersing layer(s) help shield the heat-insulating layer(s) from a high-temperature environment, allowing for the use of heat-insulating layer(s) that might otherwise burn or char prematurely in that environment. To illustrate using laminate 10*a*, the laminate has a front surface 22*a*, and heat-dispersing layer 14 defines at least a majority of (e.g., at least 90% of, up to including all of) the front surface of the laminate (e.g., the front surface's planform area), with each of heat-insulating layers 18*a* underlying the heat-dispersing layer. In this way, the heat-dispersing layer can help spread heat from the environment along the laminate, mitigating exposure of the heat-insulating layers to hot spots that might otherwise burn or char them. At least through such a configuration, laminate 10*a*—and the others discussed below—can withstand exposure to temperatures of at least 800° C., at least 1,000° C., at least 1,300° C., at least 1,600° C., at least 1,900° C., or at least 2,200° C. for a time period of at least 30 s, at least 1 min, at least 1.5 min, or at least 2 min while maintaining mechanical shape and integrity.

Figure 2A:
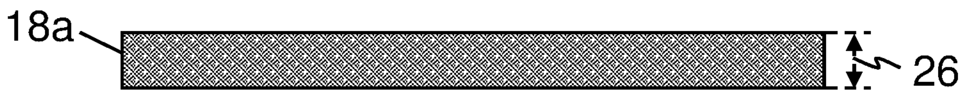
FIG. 2A is a cross-sectional side view of one of the heat-insulating layers of the laminate of FIG. 1A.

Turning to FIG. 2A, shown is a heat-insulating layer 18*a*. In some aspects, the heat-insulating layer 18*a* can comprise a porous material. In certain aspects, the porous material can be an open celled porous material. In certain other aspects, the porous material can be a closed celled porous material. In certain aspects, the porous material can be a foam. In certain aspects, the foam can be an organic or silicone foam. In certain aspects, the organic foam can be a polyurethane, polystyrene, polyvinyl chloride, (meth)acrylic polymer, polyamide, polyimide, polyaramide, polyurea, polyester, polyolefin (e.g. polyethylene, polypropylene, ethylene propylene diene monomer (EPDM) foam, or the like), polyethylene terephthalate, polybutylene terephthalate, polyvinyl chloride, polyvinyl acetate, ethyl vinyl alcohol (EVOH), ethylene-vinyl acetate (EVA), polymethyl methacrylates, polyacrylates, polycarbonates, polysulphonates, or synthetic rubber foam, or any combinations thereof. In certain aspects, the foam can be a polyurethane foam. In certain aspects, the porous material can be an aerogel. In certain aspects, the heat-insulating layer 18*a* comprises a layer of polymeric aerogel. The layer of polymeric aerogel can comprise an open-cell structure. Provided by way of illustration, at least 10%, at least 50%, at least 75%, or at least 95% of the layer of polymeric aerogel's pore volume can be made up of micropores, mesopores, and/or macropores. The layer of polymeric aerogel can have an average pore diameter that is between 50 nm and 5,000 nm (e.g., between 100 nm and 800 nm, between 100 and 500 nm, between 150 nm and 400 nm, between 200 nm and 300 nm, or between 225 nm and 275 nm). In heat-insulating layer 18*a*, the layer of polymeric aerogel has a thickness 26 that is between 1.5 mils and 800 mils, between 1.5 mils and 40 mils, between 1.5 and 20 mils, between 1.5 mils and 7.0 mils, between 3.0 mils and 7.0 mils, approximately 6.5 mils, or approximately 5.0 mils. In some aspects, in the heat-insulating layer 18*a*, the layer of polymeric aerogel has a thermal conductivity that is between 0.001 to 0.5 W/mK, between 0.005 to 0.2 W/mK, between 0.01 to 0.1 W/mK, between 0.01 to 0.5 W/mK, or approximately 0.03 W/mK, where the thermal conductivity is measured using a Netzsch HFM 436/3/1E Lamda per ASTM C518-10, steady state thermal transmission through flat slab specimens using a heat flow meter apparatus. In some aspects, the heat-insulating layer 18*a* can comprise fibers without a porous material of the present invention. In other aspects, the heat-insulating layer 18*a* can comprise a combination of fibers with a porous material of the present invention (e.g., fibers dispersed or aligned within a porous material). The fibers can be natural, synthetic, semi-synthetic fibers, or combinations thereof. The fibers can comprise vegetable, wood, animal, mineral, biological fibers, or combinations thereof. In some particular instances, the fibers can comprise rayon, bamboo, diacetate, triacetate fibers, polyester fibers, aramid fibers, or combinations thereof. In some embodiments, the fibers comprise metal fibers, carbon fibers, carbide fibers, glass fibers, mineral fibers, basalt fibers, or combinations thereof. In some embodiments, the fibers comprise thermoplastic polymer fibers, thermoset polymer fibers, or combinations thereof. Non-limiting examples of thermoplastic fibers includes fibers of polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly (phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone ketone (PEKK), acrylonitrile butyldiene styrene (ABS), polyphenylene sulfide (PPS), co-polymers thereof, or blends thereof. Non-limiting examples of thermoset fibers include a fiber of unsaturated polyester resins, polyurethanes, polyoxybenzylmethylenglycolanhydride (e.g., bakelite), urea-formaldehyde, diallylphthalate, epoxy resin, epoxy vinylesters, polyimides, cyanate esters of polycyanurates, dicyclopentadiene, phenolics, benzoxazines, co-polymers thereof, or blends thereof. In some embodiments, the fibers are polyaramid, polyimide, polybenzoxazole, polyurethane, or blends thereof. In some embodiments, the fibers are vinylon. In some embodiments, the fibers are polyester fibers. In some embodiments, the fibers are non-woven. In some embodiments, the fibers form a fiber matrix. In some embodiments, the fibers have an average filament cross sectional area of 5 $\mu m^2$ to 40,000 $\mu m^2$ and an average length of 20 mm to 100 mm. In some embodiments, the cross sectional area is 5, 10, 15, 20, 25, 50, 100, 150, 200, 250, 300, 350, 400, 450, or 500 $\mu m^2$ or between any two of those values. In some embodiments, the fibers have an average length of approximately 0.1, 0.2, 0.3, 0.4, 0.5, 1, 2, 3, 4, 5, 6, 7, 8, 9, 10, 20, 30, 40, 50, 60, 70, 80, 90, 100, 150, 200, 250, 300, 350, 400, 450, 500, 600, 700, 800, 900, 1000, 1500, 2000, 3000, 4000, 5000 mm or between any two of those values. Bundles of various kinds of fibers can be used depending on the use intended for the internally reinforced aerogel. For example, the bundles may be of carbon fibers or ceramic fibers, or of fibers that are precursors of carbon or ceramic, glass fibers, aramid fibers, or a mixture of different kinds of fiber. Bundles can include any number of fibers. For example, a bundle can include 400, 750, 800, 1375, 1000, 1500, 3000, 6000, 12000, 24000, 50000, or 60000 filaments. The fibers can have a filament diameter of 5 to 24 microns, 10 to 20 microns, or 12 to 15 microns or any range there between, or 5, 6, 7, 8, 9, 10, 11, 12, 13, 14, 15, 16, 17, 18, 19, 20, 21, 22, 23, 24 microns or any value there between. The fibers in a bundle of fibers can have an average filament cross sectional area of 7 $\mu m^2$ to 800 $\mu m^2$, which equates to an average diameter of 3 to 30 microns for circular fibers. In some embodiments, the fiber matrix comprises felt, batting, non-woven fabric, or a mat.

Materials of and processes for making layers of polymeric aerogels are explained in Sections B and C, below.

Figure 2B:
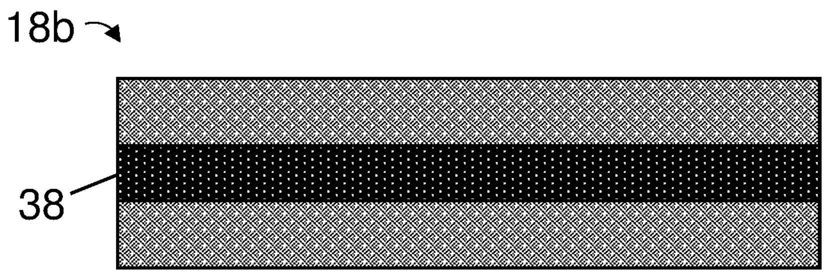
FIG. 2B is a cross-sectional side view of a heat-insulating layer that may be suitable for use in some of the present laminates.

In some embodiments, the laminate can include reinforcements to promote strength and/or rigidity, such as a plurality of fibers. For example, and referring to FIG. 2B, shown is a heat-insulating layer 18*b* that includes a reinforcing layer 38. While heat-insulating layer 18*b* includes a single reinforcing layer 38, other heat-insulating layers can have 2, 3, 4, 5, or more reinforcing layers. Such a reinforcing layer can include one or more unidirectional, woven, and/or nonwoven sheets of fibers that are dispersed within the layer of polymeric aerogel or, optionally, in a thermoplastic or thermoset resin that is distinct in structure (e.g., non-porous) and/or composition from the layer of polymeric aerogel. When including multiple sheets, a reinforcing layer can be a consolidated laminate. A sheet of a reinforcing layer 38 can also be substantially free of fibers (e.g., a polymeric film, such as a fluoropolymer film). Additionally or alternatively, at least one (e.g., each) of reinforcing layer(s) 38 can comprise a paper sheet that, optionally, comprises cellulose fibers, vinylon fibers, polyester fibers, polyolefin fibers, and/or polypropylene fibers. Suitable paper for such a reinforcing layer 38 is commercially available from Hirose Paper Mfg. Co. (Kochi, Japan) or Hirose Paper North America (Macon, Georgia, USA).

In heat-insulating layer **18*b*, reinforcing layer 38 can be embedded in the layer of polymeric aerogel and/or can be adhered to the layer of (or between layers of) polymeric aerogel via, for example, one or more adhesive layer(s) (e.g., 62, described below). In some embodiments, a reinforcing layer 38 can be disposed outside of the laminate's heat-insulating layers. A reinforcing or support layer 38** can be embedded in or attached to an aerogel layer as described in Section C. In some embodiments, for at least one (e.g., each) of the heat-insulating layer(s), reinforcing fibers can be dispersed throughout the layer of polymeric aerogel (e.g., not in a sheet as described above), optionally such that the volume of the fibers is greater than or equal to any one of, or between any two of, 0.1%, 10%, 20%, 30%, 40%, or 50% of the layer of polymeric aerogel's volume. In some embodiments, however, the laminate does not comprise fibers (e.g., to promote flexibility).

Suitable fibers include glass fibers, carbon fibers, aramid fibers, thermoplastic fibers, thermoset fibers, ceramic fibers, basalt fibers, rock wool fibers, steel fibers, cellulosic fibers, and/or the like. An average filament cross-sectional area of the fibers used for reinforcement can be greater than or equal to any one of, or between any two of, 7, 15, 30, 60, 100, 200, 300, 400, 500, 600, 700, or 800 $\mu m^2$; for example, for fibers with a circular cross-section, an average diameter of the fibers can be greater than or equal to any one of, or between any two of, 3, 4, 5, 6, 7, 8, 9, 10, 11, 12, 13, 14, 15, 16, 17, 18, 19, 20, 21, 22, 23, 24, 25, 26, 27, 28, 29, or 30 μm (e.g., between 5 and 24 μm, such as between 10 and 20 μm or between 12 and 15 μm).

Non-limiting examples of thermoplastic polymers that can be used as a material in which fibers are dispersed in a reinforcing layer 38 and/or for polymeric reinforcing fibers include polyethylene terephthalate (PET), polycarbonate (PC), polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA), polyethyleneimine or polyetherimide (PEI) and their derivatives, thermoplastic elastomer (TPE), terephthalic acid (TPA) elastomers, poly (cyclohexanedimethylene terephthalate) (PCT), polyethylene naphthalate (PEN), polyamide (PA), polysulfone sulfonate (PSS), sulfonates of polysulfones, polyether ether ketone (PEEK), polyether ketone (PEKK), acrylonitrile butyldiene styrene (ABS), polyphenylene sulfide (PPS), co-polymers thereof, polyesters or derivatives thereof, polyamides or derivatives thereof (e.g., nylon), or blends thereof.

Non-limiting examples of thermoplastic polymers that can be used as a material in which fibers are dispersed in a reinforcing layer 38 and/or for polymeric reinforcing fibers include unsaturated polyester resins, polyurethanes, polyoxybenzylmethylenglycolanhydride (e.g., Bakelite), urea-formaldehyde, diallyl-phthalate, epoxy resin, epoxy vinylesters, polyimides, cyanate esters of polycyanurates, dicyclopentadiene, phenolics, benzoxazines, co-polymers thereof, or blends thereof.

Such reinforcements can promote laminate strength and rigidity. For example, each of the heat-insulating layer(s) (e.g., **18*b*) in which the layer of polymeric aerogel is reinforced (e.g., with one or more embedded sheets and/or fiber reinforcements dispersed throughout the aerogel) can have a tensile strength that is greater than or equal to any one of, or between any two of, 5, 10, 15, 20, or 25 MPa and/or a Young's modulus that is greater than or equal to any one of, or between any two of, 200, 225, 250, 275, 300, 325, or 350 MPa. Each of reinforcing layer(s) 38 can also be more rigid than other laminate layers; for example, a flexural rigidity of each of the reinforcing layer(s) can be greater than or equal to any one of, or between any two of, 10%, 20%, 30%, or 40% larger than a flexural rigidity of each of heat-dispersing layer(s) 14 and layer(s) of polymeric aerogel of heat-insulating layer(s) (18*a*, 18*b***).

A further description of suitable reinforcements for aerogel layer(s) (e.g., that in heat-insulating layer **18*b***) is described in U.S. Pat. No. 10,500,557 to Sakaguchi et al., which is incorporated herein by reference in its entirety.

Figure 3:
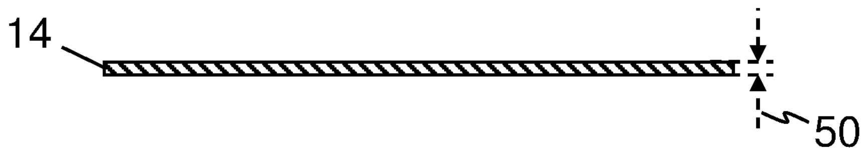
FIG. 3 is a cross-sectional side view of the heat-dispersing layer of the laminate of FIG. 1A.
Figure 4A:
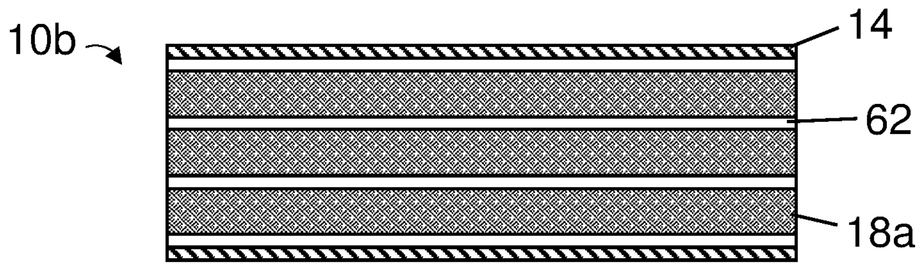
FIGS. 4A-4C depict ones of the present laminates, each having a different number of heat-dispersing layers and/or a different number of heat-insulating layers than the laminate of FIG. 1A.
Figure 4B:
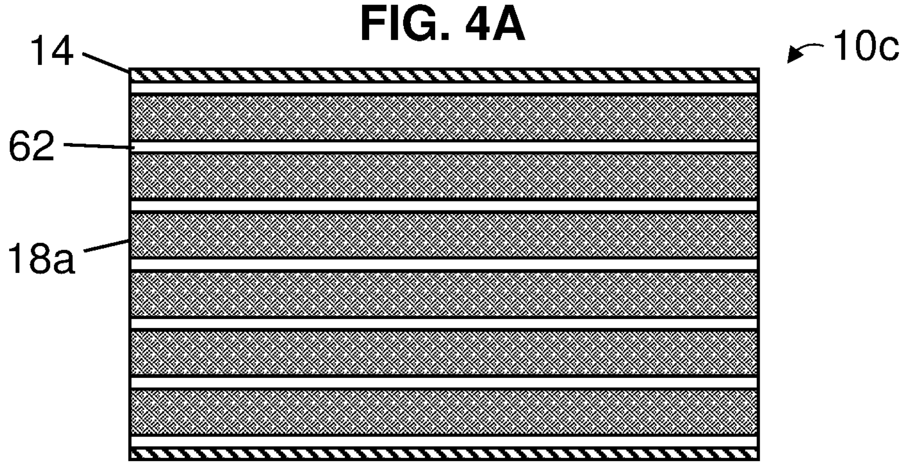
Figure 4C:
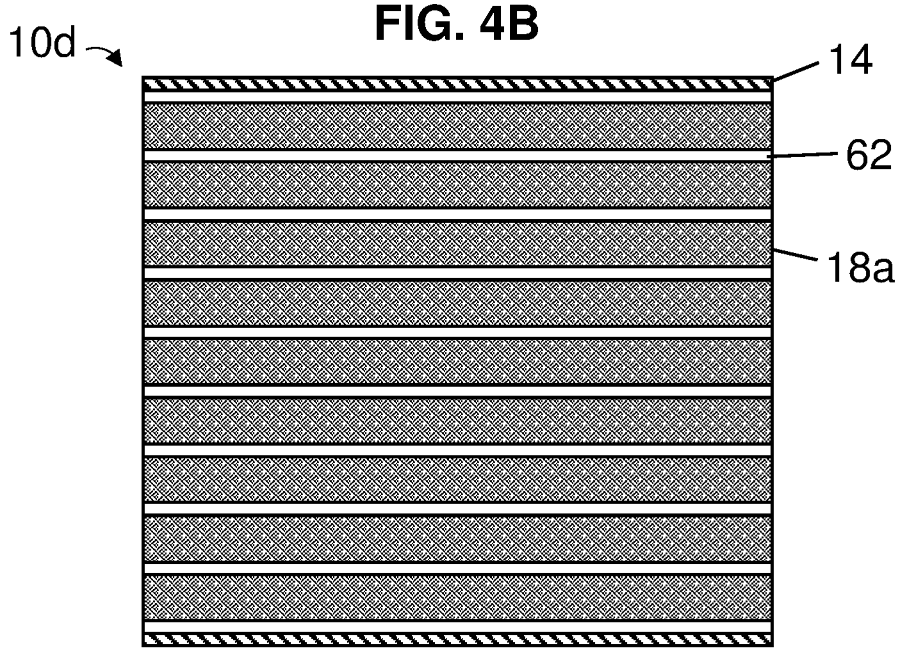

FIG. 3 depicts heat-dispersing layer 14. Heat-dispersing layer 14 can comprise greater than or equal to any one of, or between any two of, 90%, 91%, 92%, 93%, 94%, 95%, 96%, 97%, 98%, or 99% by weight of a metal or graphite. A suitable metal can be one that is stable at high temperatures and relatively thermally-conductive. For instance, such a metal can have a melting point of at least 1,300° C., at least 1,600° C., at least 1,900° C., at least 2,200° C., at least 2,400° C., at least 2,700° C., at least 3,000° C., or at least 3,300° C. (e.g., and less than 3,800° C. or less than 3,600° C.). Such a metal can also have a thermal conductivity that is greater than 15 W/Km, greater than 30 W/Km, greater than 40 W/Km, greater than 50 W/Km, greater than 75 W/Km, greater than 100 W/Km, greater than 125 W/Km, greater than 150 W/Km, or greater than 175 W/Km (e.g., and less than 200 W/Km). Non-limiting examples of such metals include molybdenum, tungsten, rhenium, tantalum, niobium, stainless steel, or an alloy thereof. Commercially-available materials (including graphite and the above metals) that can be used as heat-dispersing layer 14 are provided in TABLE 2, below.

TABLE 2

| Material | Product Name | Thickness (μm) | Melting Point (° C.) | Thermal Conductivity (W/mK) | Supplier |
|---|---|---|---|---|---|
| Graphite | N100 NeoNxGen ™ | 100 | 3,600 | ~500-1,000 | NeoGraf Solutions, LLC; Lakewood Ohio |

TABLE 2-continued

| Material | Product Name | Thickness (μm) | Melting Point (° C.) | Thermal Conductivity (W/mK) | Supplier |
|---|---|---|---|---|---|
| Niobium | Niobium Foil | 51 | 2,477 | 53.7 | Fine Metals Corporation; Ashland Virginia |
| Molybdenum | Molybdenum Foil | 51 | 2,623 | 138 | Elmet Technologies; Lewiston Maine |
| Tungsten | Tungsten Foil | 51 | 3,422 | 173 | Eagle Alloys Corporation; Talbot Tennessee |
| Tantalum | Tantalum Foil | 51 | 3,017 | 57.5 | Eagle Alloys Corporation; Talbot Tennessee |
| Rhenium | Rhenium Foil | 51 | 3,185 | 39.6 | Eagle Alloys Corporation; Talbot Tennessee |
| 316 Stainless Steel | Stainless Steel - AISI 316 - Foil | 25 | 1,370 | 16.3 | Goodfellow Corporation, Coraopolis, PA 15108-9302, USA |
| 304 Stainless Steel | Stainless Steel - 304 - Foil | 51 | 1,450 | 16.2 | McMaster-Carr, Douglassville, Georgia |

Metal layer 14 can have any suitable thickness 50, such as, for example, one that is between 1.0 mils and 10.0 mils or between 1.0 mils and 5.0 mils. As one example, metal layer 14 can have a thickness of approximately 2.0 mils.

Returning to FIG. 1B, optionally, heat-dispersing layer 14 and heat-insulating layers 18*a* are joined to one another by adhesive layers 62. Such an adhesive layer can comprise, for example, silicone (e.g., polydimethyl silicone, biphenyl silicone, and/or the like). Adhesive layers 62 can have thicknesses of between 0.5 mils and 5.0 mils, between 0.5 mils and 3.0 mils, between 0.5 mils and 2.0 mils, or between 1.0 mil and 2.0 mils. In some embodiments, at least two of a laminate's layers are joined to one another without adhesive layer. For instance, the polymeric aerogel layer of a heat-insulating layer (e.g., 18) can be formed on a heat-dispersing layer (e.g., 14, which may be a substrate as described below) and, optionally, subsequently pressed into the heat-dispersing layer (e.g., by disposing the laminate in a roll).

Laminate 10*a* can have a thickness 74—measured between its front and back surfaces, 22*a* and 22*b*—that is between 6.0 mils and 150 mils, between 6.0 mils and 75 mils, between 6.0 mils and 50 mils, or between 6.0 mils and 25 mils. And laminate 10*a* can have any suitable length 78 and width 82. For example, length 78 can be greater than or equal to any one of, or between any two of: 0.1 m, 1.0 m, 10 m, 100 m, 500 m, and 1000 m, and width 82 can be greater than or equal to any one of, or between any two of: 0.01 m, 0.05 m, 0.10 m, 0.15 m, 0.20 m, 0.25 m, 0.30 m, 0.35 m, 0.40 m, 0.45 m, 0.50 m, 0.55 m, 0.60 m, 0.65 m, 0.70 m, 0.75 m, 0.80 m, 0.85 m, 0.90 m, 0.95 m, 1.0 m, 1.5 m, 2.0 m, 2.5 m, 3.0 m, 3.5 m, 4.0 m, 4.5 m, 5.0 m, 5.5 m, and 6.0 m. Similarly, laminate 10*a* can have any suitable shape, including, for example, rectangular, square, triangular, or otherwise polygonal, or circular, elliptical, or otherwise rounded.

Laminate 10*a* can include a plurality of passageways 90, each extending through one or more of its layers, such as, for example, through one or more (up to and including each) of its adhesive layers 62, one or more (up to and including each) of its heat-insulating layers 18*a*, and/or its heat-dispersing layer 14 (for laminates with two or more heat-dispersing layers, one or more (up to including each) of the heat-dispersing layers). Such passageway(s) can facilitate venting of material (e.g., gasses) from the laminate as its layers degrade when exposed to high temperatures. Passageway(s) 90 can be relatively small; for example, the passageway(s) can be characterized as pinholes and/or can have maximum transverse dimensions that are less than or equal to any one of, or between any two of, 5.0 mm, 4.0 mm, 3.0 mm, 2.0 mm, 1.0 mm, 0.5 mm, or 0.25 mm. The venting facilitated by passageway(s) 90 can, additionally or alternatively, be facilitated by the open-cell structure of the polymeric aerogel of the heat-insulating layers.

FIGS. 4A-4D depict further embodiments of the present laminates, 10*b*-10*d*. As shown, in some embodiments, the laminate (e.g., 10*b*-10*d*) can include at least two heat-dispersing layers 14, with one defining at least a majority of (e.g., at least 90% of, up to and including all of) front surface 22*a* of the laminate (e.g., the front surface's planform area) and another defining at least a majority of (e.g., at least 90% of, up to and including all of) back surface 22*b* of the laminate (e.g., the back surface's planform area). In some embodiments, the laminate (e.g., 10*a*-10*d*) does not include any heat-dispersing layers (e.g., 14) disposed between two heat-insulating layers (e.g., 18*a*); in other words, the laminate may only include heat-dispersing layers (e.g., 14) at its front and back surfaces (e.g., 22*a*, 22*b*).

A laminate (e.g., 10*a*-10*d*) can be rigid or flexible. For example, and referring to FIG. 5, the laminate (whether or not reinforced as described above) can be capable of being disposed in a roll 94 having an inner diameter 98 of less than or equal to any one of, or between any two of, 10 cm, 8 cm, 5 cm, 4 cm, 2 cm, or 1 cm without suffering permanent deformation. Such flexibility—even if not rising to the level of this example—can be provided by the materials of the laminate's heat-dispersing, heat-insulating, and other (if present) layers and/or the relatively small thicknesses of those layers (e.g., those discussed above). A more-flexible laminate may be easier to use, less prone to cracking, and/or the like than a less-flexible laminate. However, in other embodiments, the laminate can have a higher rigidity (e.g., such that it is not capable of being disposed in such a roll without suffering permanent deformation), which can be provided by the above-described reinforcements, the materials and thicknesses of one or more of the laminate's layers, and/or the like.

Figure 5:
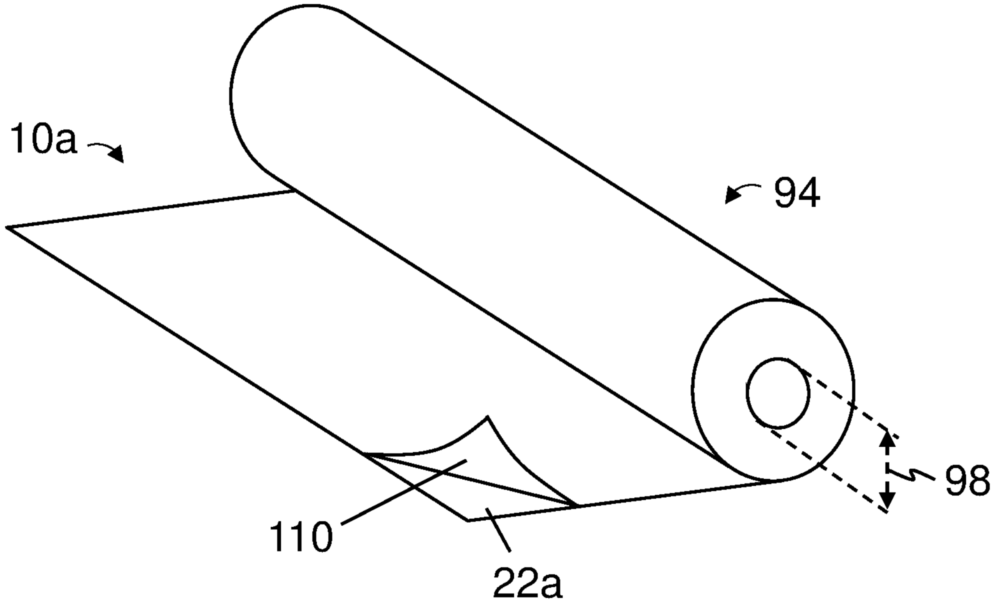
FIG. 5 depicts one of the present laminates disposed in a roll.

Also shown in FIG. 5, disclosed is a laminate (e.g., 10*a*-10*d*) having a protective film 110 removably disposed over at least one of its front and back surfaces (e.g., 22*a* and 22*b*, respectively). Protective film 110 can be removed from the laminate by, for example, peeling it away from the laminate. Such a protective film does not form part of the laminate.

The present laminates (e.g., 10*a*-10*d*) can be used in a variety of applications where it is desired to insulate a component from a high-temperature environment. One or more of the present laminates can, for example, be used to insulate a rocket motor. To illustrate, such a rocket motor can include a casing that defines an interior volume for storing propellant, and one or more of the present laminates can be disposed along and/or within the casing. As another example, one or more of the present laminates can be disposed along a wing or fin (or other surface) of an aircraft, spacecraft, missile, rocket, or the like to protect that wing, fin, or other surface (or a component it contains) from heat generated by drag. As yet another example, the present laminates can be used in ammunition. To illustrate, a tracer round includes a composition that burns so that the path that the round travels is visible. That composition, however, often burns at a high temperature, which can damage the round. To mitigate this, one or more of the present laminates can be positioned to insulate the remainder of the round from the composition. These specific examples are provided solely by way of illustration, and the present laminates are, of course, generally usable to protect components (e.g., electronic components, wires, cables, and the like) from high temperature environments.

B. Materials of Layers of Polymeric Aerogel

A layer of polymeric aerogel can include organic materials, inorganic materials, or a mixture thereof. Organic aerogels can be made from polyacrylates, polystyrenes, polyacrylonitriles, polyurethanes, polyurea, polyimides, polyamides, polyaramids, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like. In particular embodiments the aerogel is a polyimide aerogel.

Polyimides are a type of polymer with many desirable properties. Polyimide polymers include a nitrogen atom in the polymer backbone, where the nitrogen atom is connected to two carbonyl carbons, such that the nitrogen atom is somewhat stabilized by the adjacent carbonyl groups. A carbonyl group includes a carbon, referred to as a carbonyl carbon, which is double bonded to an oxygen atom. Polyimides are usually considered an AA-BB type polymer because usually two different classes of monomers are used to produce the polyimide polymer. Polyimides can also be prepared from AB type monomers. For example, an aminodicarboxylic acid monomer can be polymerized to form an AB type polyimide. Monoamines and/or mono anhydrides can be used as end capping agents if desired.

One class of polyimide monomer is usually a diamine, or a diamine monomer. The diamine monomer can also be a diisocyanate, and it is to be understood that an isocyanate could be substituted for an amine in this description, as appropriate. There are other types of monomers that can be used in place of the diamine monomer, as known to those skilled in the art. The other type of monomer is called an acid monomer, and is usually in the form of a dianhydride. In this description, the term "di-acid monomer" is defined to include a dianhydride, a tetraester, a diester acid, a tetracarboxylic acid, or a trimethylsilyl ester, all of which can react with a diamine to produce a polyimide polymer. Dianhydrides are to be understood as tetraesters, diester acids, tetracarboxylic acids, or trimethylsilyl esters that can be substituted, as appropriate. There are also other types of monomers that can be used in place of the di-acid monomer, as known to those skilled in the art.

Because one di-acid monomer has two anhydride groups, different diamino monomers can react with each anhydride group so the di-acid monomer may become located between two different diamino monomers. The diamine monomer contains two amine functional groups; therefore, after the first amine functional group attaches to one di-acid monomer, the second amine functional group is still available to attach to another di-acid monomer, which then attaches to another diamine monomer, and so on. In this manner, the polymer backbone is formed. The resulting polycondensation reaction forms a polyamic acid.

The polyimide polymer is usually formed from two different types of monomers, and it is possible to mix different varieties of each type of monomer. Therefore, one, two, or more di-acid monomers can be included in the reaction vessel, as well as one, two, or more diamino monomers. The total molar quantity of di-acid monomers is kept about the same as the total molar quantity of diamino monomers if a long polymer chain is desired. Because more than one type of diamine or di-acid can be used, the various monomer constituents of each polymer chain can be varied to produce polyimides with different properties. For example, a single diamine monomer AA can be reacted with two di-acid co monomers, $B_1B_1$ and $B_2B_2$, to form a polymer chain of the general form of $(AA\text{-}B_1B_1)_x\text{-}(AA\text{-}B_2B_2)_y$, in which x and y are determined by the relative incorporations of $B_1B_1$ and $B_2B_2$ into the polymer backbone. Alternatively, diamine co-monomers $A_1A_1$ and $A_2A_2$ can be reacted with a single di-acid monomer BB to form a polymer chain of the general form of $(A_1A_1\text{-}BB)_x\text{-}(A_2A_2\text{-}BB)_y$. Additionally, two diamine co-monomers $A_1A_1$ and $A_2A_2$ can be reacted with two di-acid co-monomers $B_1B_1$ and $B_2B_2$ to form a polymer chain of the general form $(A_1A_1\text{-}B_1B_1)_w\text{-}(A_1A_1\text{-}B_2B_2)_x\text{-}(A_2A_2\text{-}B_1B_1)_y\text{-}(A_2A_2\text{-}B_2B_2)_z$, where w, x, y, and z are determined by the relative incorporation of $A_1A_1\text{-}B_1B_1$, $A_1A_1\text{-}B_2B_2$, $A_2A_2\text{-}B_1B_1$, and $A_2A_2\text{-}B_2B_2$ into the polymer backbone. More than two di-acid co-monomers and/or more than two diamine co-monomers can also be used. Therefore, one or more diamine monomers can be polymerized with one or more di-acids, and the general form of the polymer is determined by varying the amount and types of monomers used.

There are many examples of monomers that can be used to make polymeric aerogels containing polyamic amide polymer. In some embodiments, the diamine monomer is a substituted or unsubstituted aromatic diamine, a substituted or unsubstituted alkyldiamine, or a diamine that can include both aromatic and alkyl functional groups. A non-limiting list of possible diamine monomers comprises 4,4'-oxydianiline (ODA), 3,4'-oxydianiline, 3,3'-oxydianiline, p-phenylenediamine, m-phenylenediamine, o-phenylenediamine, diaminobenzanilide, 3,5-diaminobenzoic acid, 3,3'-diaminodiphenylsulfone, 4,4'-diaminodiphenyl sulfones, 1,3-bis-(4-aminophenoxy)benzene, 1,3-bis-(3-aminophenoxy)benzene, 1,4-bis-(4-aminophenoxy)benzene, 1,4-bis-(3-aminophenoxy)benzene, 2,2-bis[4-(4-aminophenoxy) phenyl]-hexafluoropropane, 2,2-bis(3-aminophenyl)-1,1,1,3,3,3-hexafluoropropane, 4,4'-isopropylidenedianiline, 1-(4- aminophenoxy)-3-(3-aminophenoxy)benzene, 1-(4-aminophenoxy)-4-(3-aminophenoxy)benzene, bis-[4-(4-aminophenoxy)phenyl]sulfones, 2,2-bis[4-(3-aminophenoxy)phenyl]sulfones, bis(4-[4-aminophenoxy] phenyl)ether, 2,2'-bis-(4-aminophenyl)-hexafluoropropane (6F-diamine), 2,2'-bis-(4-phenoxyaniline)isopropylidene, meta-phenylenediamine, para-phenylenediamine, 1,2-diaminobenzene, 4,4'-diaminodiphenylmethane, 2,2-bis(4-aminophenyl)propane, 4,4'diaminodiphenyl propane, 4,4'-diaminodiphenyl sulfide, 4,4'-diaminodiphenylsulfone, 3,4'diaminodiphenyl ether, 4,4'-diaminodiphenyl ether, 2,6-diaminopyridine, bis(3-aminophenyl)diethyl silane, 4,4'-diaminodiphenyl diethyl silane, benzidine, dichlorobenzidine, 3,3'-dimethoxybenzidine, 4,4'-diaminobenzophenone, N,N-bis(4-aminophenyl)-n-butylamine, N,N-bis(4-aminophenyl) methylamine, 1,5-diaminonaphthalene, 3,3'-dimethyl-4,4'-diaminobiphenyl, 4-aminophenyl-3-aminobenzoate, N,N-bis(4-aminophenyl)aniline, bis(p-beta-amino-t-butylphenyl) ether, p-bis-2-(2-methyl-4-aminopentyl)benzene, p-bis(1,1-dimethyl-5-aminopentyl)benzene, 1,3-bis(4-aminophenoxy) benzene, m-xylenediamine, p-xylenediamine, 4,4'-diaminodiphenyl ether phosphine oxide, 4,4'-diaminodiphenyl N-methyl amine, 4,4'-diaminodiphenyl N-phenyl amine, amino-terminal polydimethylsiloxanes, amino-terminal polypropyleneoxides, amino-terminal polybutyleneoxides, 4,4'-Methylenebis(2-methylcyclohexylamine), 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, and 4,4'-methylenebisbenzeneamine, 2,2'-dimethylbenzidine, (also known as 4,4'-diamino-2,2'-dimethylbiphenyl (DMB)), bisaniline-p-xylidene, 4,4'-bis (4-aminophenoxy)biphenyl, 3,3'-bis(4 aminophenoxy)biphenyl, 4,4'-(1,4-phenylenediisopropylidene)bis aniline, and 4,4'-(1,3-phenylenediisopropylidene)bisaniline, or combinations thereof. In a specified embodiment, the diamine monomer is ODA, 2,2'-dimethylbenzidine, or both.

A non-limiting list of possible dianhydride ("diacid") monomers includes hydroquinone dianhydride, 3,3',4,4'-biphenyltetracarboxylic dianhydride (BPDA), pyromellitic dianhydride (PMDA), 3,3',4,4'-benzophenonetetracarboxylic dianhydride, 4,4'-oxydiphthalic anhydride, 3,3',4,4'-diphenylsulfonetetracarboxylic dianhydride, 4,4'-(4,4'-isopropylidenediphenoxy)bis(phthalic anhydride), 2,2-bis(3,4-dicarboxyphenyl)propane dianhydride, 4,4'-(hexafluoroisopropylidene)diphthalic anhydride, bis(3,4-dicarboxyphenyl) sulfoxide dianhydride, polysiloxane-containing dianhydride, 2,2',3,3'-biphenyltetracarboxylic dianhydride, 2,3,2',3'-benzophenonetetraearboxylic dianhydride, naphthalene-2,3,6,7-tetracarboxylic dianhydride, naphthalene-1,4,5,8-tetracarboxylie dianhydride, 4,4'-oxydiphthalic dianhydride, 3,3',4,4'-biphenylsulfone tetracarboxylic dianhydride, 3,4,9,10-perylene tetracarboxylic dianhydride, bis(3,4-dicarboxyphenyl)sulfide dianhydride, bis(3,4-dicarboxyphenyl)methane dianhydride, 2,2-bis(3,4-dicarboxyphenyl)propane dianhydride, 2,2-bis(3,4-dicarboxyphenyl)hexafluoropropane, 2,6-dichloronaphthalene-1,4,5,8-tetracarboxylic dianhydride, 2,7-dichloronapthalene-1,4,5,8-tetracarboxylic dianhydride, 2,3,6,7-tetrachloronaphthalene-1,4,5,8-tetracarboxylic dianhydride, phenanthrene, 8,9,10-tetracarboxylic dianhydride, pyrazine-2,3,5,6-tetracarboxylic dianhydride, benzene-1,2,3,4-tetracarboxylic dianhydride, and thiophene-2,3,4,5-tetracarboxylic dianhydride. In a specific embodiment, the dianhydride monomer is BPDA, PMDA, or both.

In some aspects, the molar ratio of anhydride to total diamine is from 0.4:1 to 1.6:1, 0.5:1 to 1.5:1, 0.6:1 to 1.4:1, 0.7:1 to 1.3:1, or specifically from 0.8:1 to 1.2:1. In further aspects, the molar ratio of dianhydride to multifunctional amine (e.g., triamine) is 2:1 to 140:1, 3:1 to 130:1, 4:1 to 120:1, 5:1 to 110:1, 6:1 to 100:1, 7:1 to 90:1, or specifically from 8:1 to 80:1. Mono-anhydride groups can also be used. Non-limiting examples of mono-anhydride groups include 4-amino-1,8-naphthalic anhydride, endo-bicyclo[2.2.2]oct-5-ene-2,3-dicarboxylic anhydride, citraconic anhydride, trans-1,2-cyclohexanedicarboxylic anhydride, 3,6-dichlorophthalic anhydride, 4,5-dichlorophthalic anhydride, tetrachlorophthalic anhydride 3,6-difluorophthalic anhydride, 4,5-difluorophthalic anhydride, tetrafluorophthalic anhydride, maleic anhydride, 1-cyclopentene-1,2-dicarboxylic anhydride, 2,2-dimethylglutaric anhydride 3,3-dimethylglutaric anhydride, 2,3-dimethylmaleic anhydride, 2,2-dimethylsuccinic anhydride, 2,3-diphenylmaleic anhydride, phthalic anhydride, 3-methylglutaric anhydride, methylsuccinic anhydride, 3-nitrophthalic anhydride, 4-nitrophthalic anhydride, 2,3-pyrazinedicarboxylic anhydride, or 3,4-pyridinedicarboxylic anhydride. Specifically, the mono-anhydride group can be phthalic anhydride.

In another embodiment, the polymer compositions used to prepare layers of polymeric aerogel include multifunctional amine monomers with at least three primary amine functionalities. The multifunctional amine may be a substituted or unsubstituted aliphatic multifunctional amine, a substituted or unsubstituted aromatic multifunctional amine, or a multifunctional amine that includes a combination of an aliphatic and two aromatic groups, or a combination of an aromatic and two aliphatic groups. A non-limiting list of possible multifunctional amines include propane-1,2,3-triamine, 2-aminomethylpropane-1,3-diamine, 3-(2-aminoethyl)pentane-1,5-diamine, bis(hexamethylene)triamine, N',N'-bis(2-aminoethyl)ethane-1,2-diamine, N',N'-bis(3-aminopropyl)propane-1,3-diamine, 4-(3-aminopropyl)heptane-1,7-diamine, N',N'-bis(6-aminohexyl)hexane-1,6-di amine, benzene-1,3,5-triamine, cyclohexane-1,3,5-triamine, melamine, N-2-dimethyl-1,2,3-propanetriamine, diethylenetriamine, 1-methyl or 1-ethyl or 1-propyl or 1-benzyl-substituted diethylenetriamine, 1,2-dibenzyldiethylenetriamine, lauryldiethylenetriamine, N-(2-hydroxypropyl) diethylenetriamine, N,N-bis(1-methylheptyl)-N-2-dimethyl-1,2,3-propanetriamine, 2,4,6-tris(4-(4-aminophenoxy)phenyl)pyridine, N,N-dibutyl-N-2-dimethyl-1,2,3-propanetriamine, 4,4'-(2-(4-aminobenzyl) propane-1,3-diyl)dianiline, 4-((bis(4-aminobenzyl)amino) methyl)aniline, 4-(2-(bis(4-aminophenethyl)amino)ethyl) aniline, 4,4'-(3-(4-aminophenethyl)pentane-1,5-diyl) dianiline, 1,3,5-tris(4-aminophenoxy)benzene (TAPOB), 4,4',4"-methanetriyltrianiline, N,N,N',N'-Tetrakis(4-aminophenyl)-1,4-phenylenediamine, a polyoxypropylenetriamine, octa(aminophenyl)polyhedral oligomeric silsesquioxane, or combinations thereof. A specific example of a polyoxypropylenetriamine is JEFFAMINE® T-403 from Huntsman Corporation, The Woodlands, TX USA. In a specific embodiment, the aromatic multifunctional amine may be 1,3,5-tris(4-aminophenoxy)benzene or 4,4',4"-methanetriyltrianiline. In some embodiments, the multifunctional amine includes three primary amine groups and one or more secondary and/or tertiary amine groups, for example, N',N'-bis(4-aminophenyl)benzene-1,4-diamine.

Non-limiting examples of capping agents or groups include amines, maleimides, nadimides, acetylene, biphenylenes, norbornenes, cycloalkyls, and N-propargyl and specifically those derived from reagents including 5-norbornene-2,3-dicarboxylic anhydride (nadic anhydride, NA), methyl-nadic anhydride, hexachloro-nadic anhydride, cis-4- cyclohexene-1,2-dicarboxylic anhydride, 4-amino-N-propargylphthalimide, 4-ethynylphthalic anhydride, and maleic anhydride.

The characteristics or properties of the final polymer are significantly impacted by the choice of monomers that are used to produce the polymer. Factors to be considered when selecting monomers include the properties of the final polymer, such as the flexibility, thermal stability, coefficient of thermal expansion (CTE), coefficient of hydroscopic expansion (CHE), and any other properties specifically desired, as well as cost. Often, certain important properties of a polymer for a particular use can be identified. Other properties of the polymer may be less significant, or may have a wide range of acceptable values; so many different monomer combinations could be used.

In some instances, the backbone of the polymer can include substituents. The substituents (e.g., oligomers, functional groups, etc.) can be directly bonded to the backbone or linked to the backbone through a linking group (e.g., a tether or a flexible tether). In other embodiments, a compound or particles can be incorporated (e.g., blended and/or encapsulated) into the polyimide structure without being covalently bound to the polyimide structure. In some instances, the incorporation of the compound or particles can be performed during the polyamic reaction process. In some instances, particles can aggregate, thereby producing polyimides having domains with different concentrations of the non-covalently bound compounds or particles.

Specific properties of a polyimide can be influenced by incorporating certain compounds into the polyimide. The selection of monomers is one way to influence specific properties. Another way to influence properties is to add a compound or property modifying moiety to the polyimide.

C. Preparation of Layers of Polymeric Aerogel

Polymeric aerogel films that can be used in at least some of the present laminates are commercially-available. Non-limiting examples of such films include the Blueshift AeroZero® rolled thin film (available from Blueshift Materials, Inc. (Spencer, Massachusetts) and Airloy® films (available from Aerogel Technologies, LLC), with the Blueshift AeroZero® rolled thin film being preferred in some aspects.

Further, and in addition to the processes discussed below, polymeric aerogels (films, stock shapes or monoliths, etc.) can be made using the methodology described in International Patent Application Publication Nos. WO 2014/189560 to Rodman et al., 2017/07888 to Sakaguchi et al., 2018/078512 to Yang et al., 2018/140804 to Sakaguchi et al., and 2019/006184 to Irvin et al., International Patent Application No. PCT/US2019/029191 to Ejaz et al., U.S. Patent Application Publication No. 2017/0121483 to Poe et al., and/or U.S. Pat. No. 9,963,571 to Sakaguchi et al., all of which are incorporated herein by reference in their entireties.

The following provides non-limiting processes that can be used to make layers of polymeric aerogel suitable for use in the present laminates. These processes can include: (1) preparation of the polymer gel; (2) optional solvent exchange, (3) drying of the polymeric solution to form the aerogel; and (4) attaching a polymeric aerogel film on a substrate.

1. Formation of a Polymer Gel

The first stage in the synthesis of an aerogel can be the synthesis of a polymerized gel. For example, if a polyimide aerogel is desired, at least one acid monomer can be reacted with at least one diamino monomer in a reaction solvent to form a polyamic acid. As discussed above, numerous acid monomers and diamino monomers may be used to synthesize the polyamic acid. In one aspect, the polyamic acid is contacted with an imidization catalyst in the presence of a chemical dehydrating agent to form a polymerized polyimide gel via an imidization reaction. "Imidization" is defined as the conversion of a polyimide precursor into an imide. Any imidization catalyst suitable for driving the conversion of polyimide precursor to the polyimide state is suitable. Non-limiting examples of chemical imidization catalysts include pyridine, methylpyridines, quinoline, isoquinoline, 1,8-diazabicyclo[5.4.0]undec ene (DBU), triethylenediamine, lutidine, N-methylmorpholine, triethylamine, tripropylamine, tributylamine, other trialkylamines, 2-methyl imidazole, 2-ethyl-4-methylimidazole, imidazole, other imidazoles, and combinations thereof. Any dehydrating agent suitable for use in formation of an imide ring from an amic acid precursor is suitable for use in the methods of the present invention. Preferred dehydrating agents comprise at least one compound selected from the group consisting of acetic anhydride, propionic anhydride, n-butyric anhydride, benzoic, anhydride, trifluoroacetic anhydride, phosphorus trichloride, and dicyclohexylcarbodiimide.

In one aspect of the current invention, one or more diamino monomers and one or more multifunctional amine monomers are premixed in one or more solvents and then treated with one or more dianhydrides (e.g., di-acid monomers) that are added in sequentially smaller amounts at pre-defined time increments while monitoring the viscosity. The desired viscosity of the polymerized solution can range from 50 to 20,000 cP or specifically 500 to 5,000 cP. By performing the reaction using incremental addition of dianhydride while monitoring viscosity, a non-crosslinked aerogel can be prepared. For instance, a triamine monomer (23 equiv.) can be added to the solvent to give a 0.0081 molar solution. To the solution, a first diamine monomer (280 equiv.) can be added, followed by a second diamine monomer (280 equiv.). Next a dianhydride (552 total equiv.) can be added in sequentially smaller amounts at pre-defined time increments while monitoring the viscosity. The dianhydride can be added until the viscosity reaches 1,000 to 1,500 cP. For example, a first portion of dianhydride can be added, the reaction can be stirred (e.g., for 20 minutes), a second portion of dianhydride can be added, and a sample of the reaction mixture can then be analyzed for viscosity. After stirring for additional time (e.g., for 20 minutes), a third portion of dianhydride can be added, and a sample can be taken for analysis of viscosity. After further stirring for a desired period of time (e.g., 10 hours to 12 hours), a mono-anhydride (96 equiv.) can be added. After having reached the target viscosity, the reaction mixture can be stirred for a desired period of time (e.g., 10 hours to 12 hours) or the reaction is deemed completed.

The reaction temperature for the gel formation can be determined by routine experimentation depending on the starting materials. In a preferred embodiment, the temperature can be greater than or equal to any one of, or between any two of: 15° C., 20° C., 30° C., 35° C., 40° C., and 45° C. After a desired amount of time (e.g., about 2 hours), the product can be isolated (e.g., filtered), after which a nitrogen-containing hydrocarbon (828 equiv.) and dehydration agent (1214 equiv.) can be added. The addition of the nitrogen-containing hydrocarbon and/or dehydration agent can occur at any temperature. In some embodiments, the nitrogen-containing hydrocarbon and/or dehydration agent is added to the solution at 20° C. to 28° C. (e.g., room temperature) and stirred for a desired amount of time at that temperature. In some instances, after addition of nitrogen-containing hydrocarbon and/or dehydration agent, the solution temperature is raised up to 150° C.

The reaction solvent can include dimethylsulfoxide (DMSO), diethylsulfoxide, N,N-dimethylformamide (DMF), N,N-diethylformamide, N,N-dimethylacetamide (DMAc), N,N-diethylacetamide, N-methyl-2-pyrrolidone (NMP), 1-methyl-2-pyrrolidinone, N-cyclohexyl-2-pyrrolidone, 1,13-dimethyl-2-imidazolidinone, diethyleneglycoldimethoxyether, o-dichlorobenzene, phenols, cresols, xylenol, catechol, butyrolactones, hexamethylphosphoramide, and mixtures thereof. The reaction solvent and other reactants can be selected based on the compatibility with the materials and methods applied; i.e., if the polymerized polyamic amide gel is to be cast onto a support film, injected into a moldable part, or poured into a shape for further processing into a workpiece. In a specific embodiment, the reaction solvent is DMSO.

While keeping the above in mind, the introduction of macropores into the aerogel polymeric matrix, as well as the amount of such macropores present, can be performed in the manner described in the Summary. In one non-limiting manner, the formation of macropores versus smaller mesopores and micropores can be primarily controlled by controlling the polymer/solvent dynamics during gel formation. By doing so, the pore structure can be controlled, and the quantity and volume of macroporous, mesoporous, and microporous cells can be controlled. For example, a curing additive that reduces the solubility of the polymers being formed during polymerization, such as 1,4-diazabicyclo [2.2.2]octane, can produce a polymer gel containing a higher number of macropores as compared to another curing additive that improves the resultant polymer solubility, such as triethylamine. In another specific non-limiting example, when forming a polyimide aerogel, increasing the ratio of rigid amines (e.g., p-phenylenediamine (p-PDA)) to more flexible diamines (e.g., —ODA) incorporated into the polymer backbone can favor the formation of macropores over smaller mesopores and micropores.

The polymer solution may optionally be cast onto a casting sheet covered by a support film for a period of time. Casting can include spin casting, gravure coating, three roll coating, knife over roll coating, slot die extrusion, dip coating, Meyer rod coating, or other techniques. In one embodiment, the casting sheet is a polyethylene terephthalate (PET) casting sheet. After a passage of time, the polymerized reinforced gel is removed from the casting sheet and prepared for the solvent exchange process. In some embodiments, the cast film can be heated in stages to elevated temperatures to remove solvent and convert the amic acid functional groups in the polyamic acid to imides with a cyclodehydration reaction, also called imidization. In some instances, polyamic acids may be converted in solution to polyimides with the addition of the chemical dehydrating agent, catalyst, and/or heat.

In some embodiments, the polyimide polymers can be produced by preparing a polyamic acid polymer in the reaction vessel. The polyamic acid is then formed into a sheet or a film and subsequently processed with catalysts or heat and catalysts to convert the polyamic acid to a polyimide.

Wet gels used to prepare aerogels may be prepared by any known gel-forming techniques, for example adjusting the pH and/or temperature of a dilute metal oxide sol to a point where gelation occurs.

2. Optional Solvent Exchange

After the polymer gel is synthesized, it may be desirable in certain instances to conduct a solvent exchange wherein the reaction solvent is exchanged for a more desirable second solvent. Accordingly, in one embodiment, a solvent exchange can be conducted wherein the polymerized gel is placed inside of a pressure vessel and submerged in a mixture comprising the reaction solvent and the second solvent. Then, a high-pressure atmosphere is created inside of the pressure vessel, thereby forcing the second solvent into the polymerized gel and displacing a portion of the reaction solvent. Alternatively, the solvent exchange step may be conducted without the use of a high-pressure environment. It may be necessary to conduct a plurality of rounds of solvent exchange. In some embodiments, solvent exchange is not necessary.

The time necessary to conduct the solvent exchange will vary depending upon the type of polymer undergoing the exchange as well as the reaction solvent and second solvent being used. In one embodiment, each solvent exchange can take from 1 to 168 hours or any period time there between, including 2, 3, 4, 5, 6, 7, 8, 9, 10, 11, 12, 13, 14, 15, 16, 17, 18, 19, 20, 21, 22, or 23, 24, 25, 50, 75, 100, 125, 150, 155, 160, 165, 166, 167, or 168 hours. In another embodiment, each solvent exchange can take approximately 1 to 60 minutes, or about 30 minutes. Exemplary second solvents include methanol, ethanol, 1-propanol, 2-propanol, 1-butanol, 2-butanol, isobutanol, tert-butanol, 3-methyl-2-butanol, 3,3-dimethyl-2-butanol, 2-pentanol, 3-pentanol, 2,2-dimethylpropan-1-ol, cyclohexanol, diethylene glycol, cyclohexanone, acetone, acetyl acetone, 1,4-dioxane, diethyl ether, dichloromethane, trichloroethylene, chloroform, carbon tetrachloride, water, and mixtures thereof. In certain non-limiting embodiments, the second solvent can have a suitable freezing point for performing supercritical or subcritical drying steps. For example, tert-butyl alcohol has a freezing point of 25.5° C. and water has a freezing point of 0° C. under one atmosphere of pressure. Alternatively, and as discussed below, however, the drying can be performed without the use of supercritical or subcritical drying steps, such as by evaporative drying techniques.

The temperature and pressure used in the solvent exchange process may be varied. The duration of the solvent exchange process can be adjusted by performing the solvent exchange at a varying temperatures or atmospheric pressures, or both, provided that the pressure and temperature inside the pressure vessel do not cause either the first solvent or the second solvent to leave the liquid phase and become gaseous phase, vapor phase, solid phase, or supercritical fluid. Generally, higher pressures and/or temperatures decrease the amount of time required to perform the solvent exchange, and lower temperatures and/or pressures increase the amount of time required to perform the solvent exchange.

3. Cooling and Drying

In one embodiment, after solvent exchange, the polymerized gel can be exposed to supercritical drying. In this instance, the solvent in the gel can be removed by supercritical $CO_2$ extraction.

In another embodiment, after solvent exchange, the polymerized gel can be exposed to subcritical drying. In this instance, the gel can be cooled below the freezing point of the second solvent and subjected to a freeze drying or lyophilization process to produce the aerogel. For example, if the second solvent is water, then the polymerized gel is cooled to below 0° C. After cooling, the polymerized gel can be subjected to a vacuum for a period of time to allow sublimation of the second solvent.

In still another embodiment, after solvent exchange, the polymerized gel can be exposed to subcritical drying with optional heating after the majority of the second solvent has been removed through sublimation. In this instance the partially dried gel material is heated to a temperature near or above the boiling point of the second solvent for a period of time. The period of time can range from a few hours to several days, although a typical period of time is approximately 4 hours. During the sublimation process, a portion of the second solvent present in the polymerized gel is removed, leaving a gel that can have macropores, mesopores, or micropores, or any combination thereof or all of such pore sizes. After the sublimation process is complete, or nearly complete, the aerogel has been formed.

In yet another embodiment after solvent exchange, the polymerized gel can be dried under ambient conditions, for example, by removing the solvent under a stream of gas (e.g., air, anhydrous gas, inert gas (e.g., nitrogen ($N_2$) gas), etc.). Still further, passive drying techniques can be used such as simply exposing the gel to ambient conditions without the use of a gaseous stream.

Once cooled or dried, the films and stock shapes can be configured for use in the present laminates. For example, the films or stock shapes can be processed into desired shapes (e.g., by cutting or grinding) such as square shapes, rectangular shapes, circular shapes, triangular shapes, irregular shapes, random shapes, etc. Also, and as discussed above, the films or stock shapes can be affixed to a support material such as with an adhesive. In alternative embodiments, a support material can be incorporated into the matrix of the polymeric aerogel, which is discussed below.

4. Incorporation of a Support Material into the Matrix of the Polymeric Aerogel

In addition to the methods discussed above with respect to the use of adhesives for attaching a polymeric aerogel to a support material, an optional embodiment of the present invention can include incorporation of the support material into the polymeric matrix to create a reinforced polymeric aerogel without the use of adhesives. Notably, during manufacture of a non-reinforced polymer aerogel, a reinforcing support film can be used as a carrier to support the gelled film during processing. During rewinding, the gelled film can be irreversibly pressed into the carrier film. Pressing the gelled film into the carrier film can provide substantial durability improvement. In another instance, during the above-mentioned solvent casting step, the polymer solution can be cast into a reinforcement or support material.

The substrate selection and direct casting can allow optimization of (e.g., minimization) of the thickness of the resulting reinforced aerogel material. This process can also be extended to the production of fiber-reinforced polymer aerogels—internally reinforced polyimide aerogels are provided as an example. The process can include: (a) forming a polyamic acid solution from a mixture of dianhydride and diamine monomers in a polar solvent such as DMSO, DMAc, NMP, or DMF; (b) contacting the polyamic acid solution with chemical curing agents listed above and a chemical dehydrating agent to initiate chemical imidization; (c) casting the polyamic acid solution onto a fibrous support prior to gelation and allow it to permeate it; (d) allowing the catalyzed polyamic acid solution to gel around, and into, the fibrous support during chemical imidization; (e) optionally performing a solvent exchange, which can facilitate drying; and (f) removal of the transient liquid phase contained within the gel with supercritical, subcritical, or ambient drying to give an internally reinforced aerogel.

EXAMPLES

The present invention will be described in greater detail by way of specific examples. The following examples are offered for illustrative purposes only and are not intended to limit the invention in any manner. Those of ordinary skill in the art will readily recognize a variety of noncritical parameters, which can be changed or modified to yield essentially the same results.

TABLE 2 lists the acronyms for the compounds used in the following Examples.

TABLE 2

| Acronym | Name |
|---|---|
| BPDA | 3,3',4,4'-biphenyltetracarboxylic dianhydride |
| DMB | 4,4'-Diamino-2,2'-dimethylbiphenyl |
| DMSO | Dimethylsulfoxide |
| PA | Phthalic anhydride |
| PMDA | Pyromellitic dianhydride |
| ODA | 4,4'-Oxydianiline |
| TAPOB | 1,3,5-Tris(4-aminophenoxy) benzene |

Structures of the starting materials are shown below.

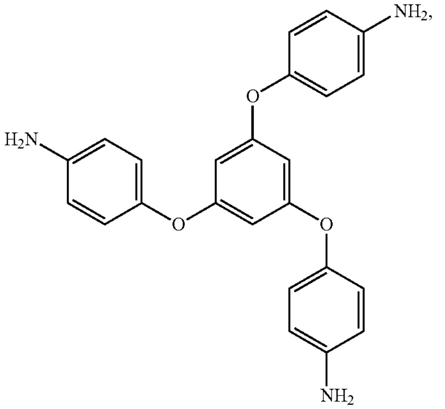

TAPOB

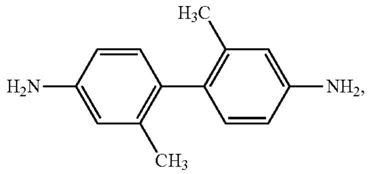

DMB

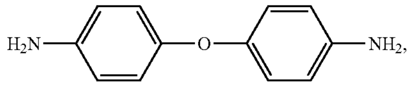

ODA

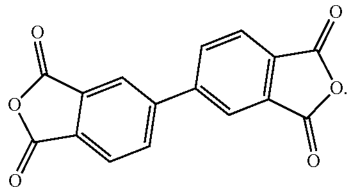

BPDA

Example 1

Preparation of a Highly Branched BPDA/DMB-ODA Polyimide

A reaction vessel with a mechanical stirrer and a water jacket was used. The flow of the water through the reaction vessel jacket was adjusted to maintain temperature in the range of 18-35° C. The reaction vessel was charged with DMSO (108.2 lbs. 49.1 kg), and the mechanical stirrer speed was adjusted to 120-135 rpm. TAPOB (65.13 g) was added to the solvent. To the solution was added DMB (1081.6 g), followed by ODA (1020.2 g). A first portion of BPDA (1438.4 g) was then added. After stirring for 20 minutes, a sample of the reaction mixture was analyzed for viscosity using a Brookfield DV1 viscometer (Brookfield, AMETEK, U.S.A.). A second portion of BPDA (1407.8 g) was added, and the reaction mixture was stirred for 20 additional minutes. A third portion of BPDA (138.62 g) was added, and the reaction mixture was stirred for 20 minutes. A sample of the reaction mixture was analyzed for viscosity. After stirring for 8 hours, PA (86.03 g) was added. The resulting reaction mixture was stirred until no more solids were visible. After 2 hours, the product was removed from the reaction vessel, filtered, and weighed.

Example 2

Preparation of a Highly Branched Polyimide Aerogel Monolith by Freeze Drying

Figure 6:
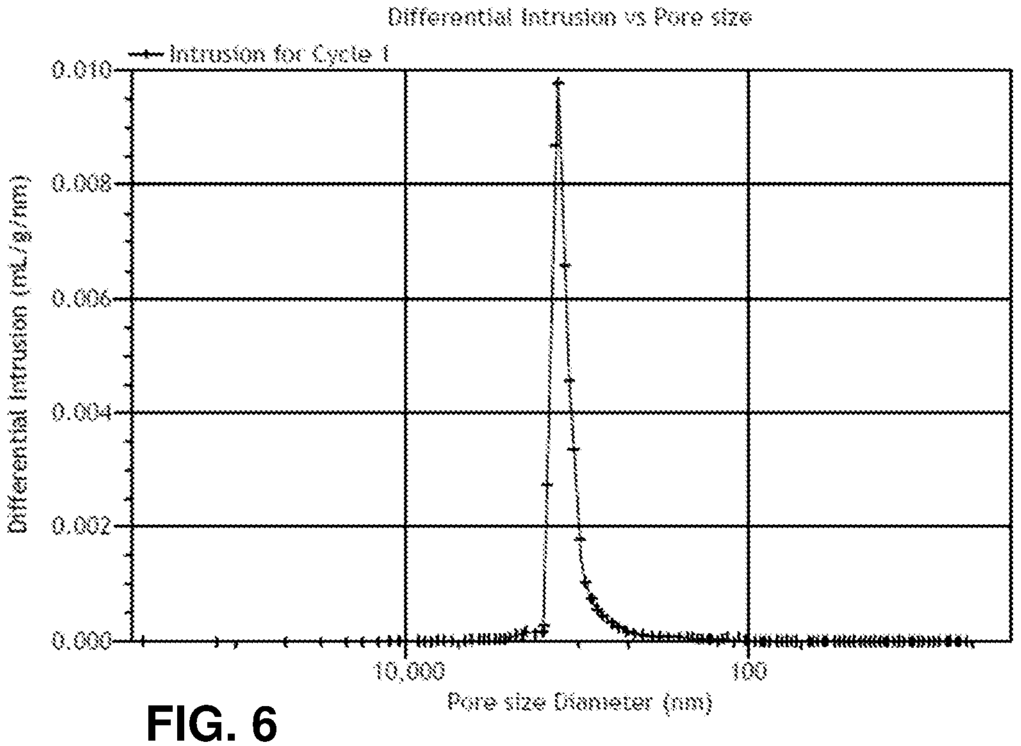
FIG. 6 is a distribution of pore size diameter for a first non-limiting aerogel of the present invention.

The resin (about 10,000 grams) prepared in Example 1 was mixed with triethylamine (about 219 grams) and acetic anhydride (about 561 grams) for five minutes. After mixing, the resultant solution was poured into a square 15"×15" mold and left for 48 hours. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times. The part was subsequently flash frozen and subjected to subcritical drying for 96 hours in at 5° C., followed by drying in vacuum at 50° C. for 48 hours. The final recovered aerogel part had an open-cell structure as observed by scanning electron microscopy (SEM) performed on a Phenom Pro Scanning Electron Microscope (Phenom-World, the Netherlands), exhibited a density of 0.22 $g/cm^3$ and a porosity of 88.5% as measured according to ASTM D4404-10 with a Micromeritics® AutoPore V 9605 Automatic Mercury Penetrometer (Micromeritics® Instrument Corporation, U.S.A.), a compression modulus of 2.2 MPa as determined by American Standard Testing Method (ASTM) D395-16, and a compression strength at 25% strain of 3.5 MPa as determined by ASTM D395-16. The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is provided in FIG. 6. From the data it was determined that 100% of the pores were macropores and that the average pore diameter was about 1,200 nm, thus confirming that a macroporously-structured aerogel was produced.

Example 3

Preparation of a Highly Branched Polyimide Aerogel Monolith by Thermal Drying

The resin (about 10,000 grams) prepared in Example 1 was mixed with triethylamine (about 219 grams) and acetic anhydride (about 561 grams) for five minutes at a temperature of 10-35° C. After mixing, the resultant solution was poured into a square 15"×15" mold and left for 48 hours. The gelled shape was removed from the mold and placed into an acetone bath. After immersion for 24 hours, the acetone bath was exchanged with fresh acetone. The soak and exchange process was repeated five times. After the final exchange, the part was dried with an ambient (about 20 to 30° C.) drying process to evaporate a majority of the acetone over 48 hours followed by thermal drying at 50° C. for 4 hours, 100° C. for 2 hours, 150° C. for 1 hour, and then 200° C. for 30 minutes. The final recovered aerogel had similar properties as observed in Example 2.

Example 4

Preparation of a Highly Branched Polyimide

TAPOB (about 2.86 g) was added to the reaction vessel charged with about 2,523.54 g DMSO as described in Example 1 at a temperature of 18-35° C. To the solution was added a first portion of DMB (about 46.75 g), followed by a first portion of ODA (about 44.09 g). After stirring for about 20 minutes, a first portion of BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 20 minutes, TAPOB (about 2.86 g), DMB (about 46.75 g), and ODA (about 44.09 g) were added. After stirring for about 20 minutes, BPDA (about 119.46 g) was added. After stirring for about 8 hours, PA (about 50.12 g) was added. The resulting reaction mixture was stirred until no more solids were visible. After about 2 hours, the product was removed from the reaction vessel, filtered, and weighed.

Example 5

Preparation of a Highly Branched Polyimide Aerogel Monolith by Freeze Drying

Figure 7:
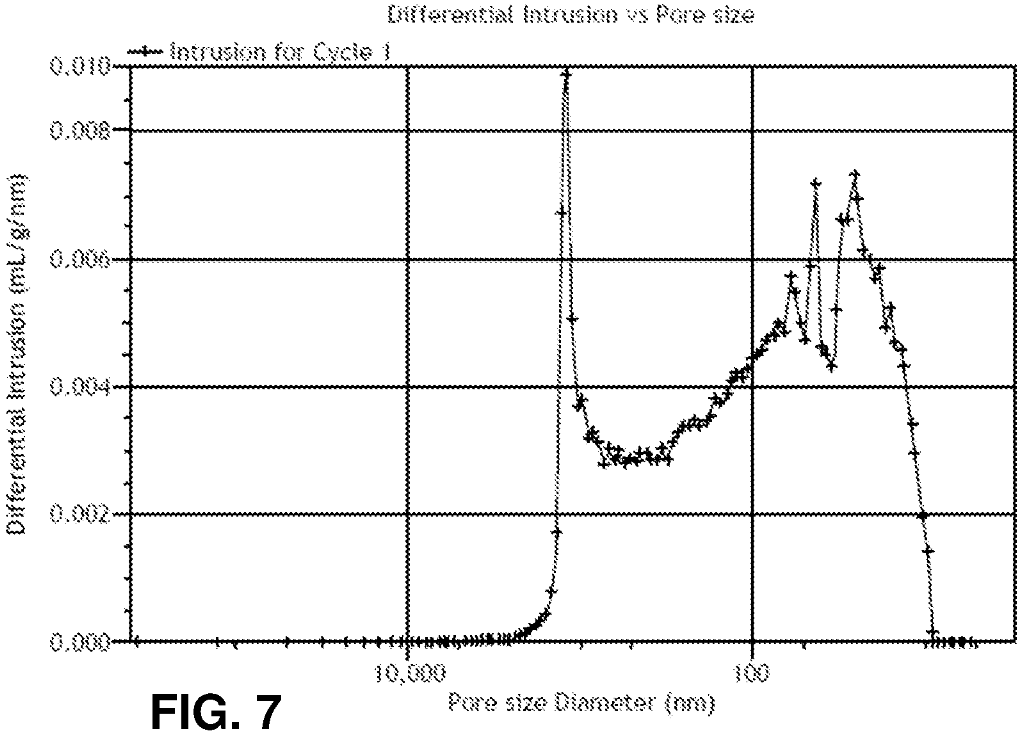
FIG. 7 is a distribution of pore size diameter for a second non-limiting aerogel of the present invention.

The resin (about 400 grams) prepared in Example 4 was mixed with 2-methylimidazole (about 53.34 grams) for five minutes and then benzoic anhydride (about 161.67 grams) for five minutes at a temperature of 18-35° C. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times The part was subsequently frozen on a shelf freezer, and subjected to subcritical drying for 96 hours in at 5° C., followed by drying in vacuum at 50° C. for 48 hours. The final recovered aerogel part had an open-cell structure as observed by scanning electron microscopy (SEM) performed on a Phenom Pro Scanning Electron Microscope (Phenom-World, the Netherlands), and exhibited a density of 0.15 $g/cm^3$ and a porosity of 92.2% as measured according to ASTM D4404-10 with a Micromeritics® AutoPore V 9605 Automatic Mercury Penetrometer (Micromeritics® Instrument Corporation, U.S.A.). The distribution of pore sizes were measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 7. From the data, it was determined that the 96.3% of the shaped aerogel's pore volume was made up of pores having an average pore diameter of greater than 50 nm, and thus a macroporously-structured aerogel was formed.

Example 6

Preparation of a Highly Branched Polyimide

TAPOB (about 2.05 g) was added to the reaction vessel charged with about 2,776.57 g DMSO as described in Example 1 at a temperature of 18-35° C. To the solution was added a first portion of DMB (about 33.54 g), followed by a first portion of ODA (about 31.63 g). After stirring for about 20 minutes, a first portion of PMDA (about 67.04 g) was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 20 minutes, TAPOB (about 2.05 g), DMB (about 33.54 g), and ODA (about 31.63 g) were added. After stirring for about 20 minutes, PMDA (about 67.04 g) was added. After stirring for about 8 hours, PA (about 18.12 g) was added. The resulting reaction mixture was stirred until no more solids were visible. After about 2 hours, the product was removed from the reaction vessel, filtered, and weighed.

Example 7

Preparation of a Highly Branched Polyimide Aerogel Monolith by Freeze Drying

Figure 8:
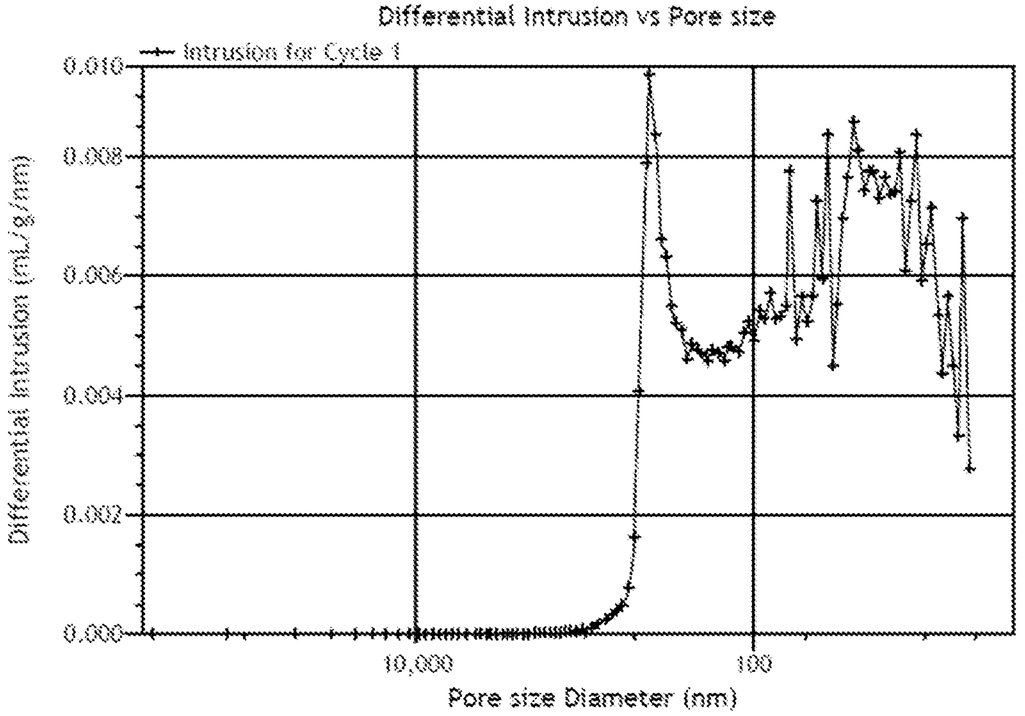
FIG. 8 is a distribution of pore size diameter for a third non-limiting aerogel of the present invention.

The resin (about 400 grams) prepared in Example 6 was mixed with 2-methylimidazole (about 40.38 grams) for five minutes and then benzoic anhydride (about 122.38 grams) for five minutes at a temperature of 18-35° C. After mixing, the resultant solution was poured into a square 3"×3" mold and placed in an oven at 75° C. for 30 minutes and then left overnight at room temperature. The gelled shape was removed from the mold, and placed into an acetone bath. After immersion for 24 hours, the acetone bath was exchanged with fresh acetone. The soak and exchange process was repeated five times. After the final exchange, the bath was replaced with tertiary butyl alcohol. After immersion for 24 hours, the tertiary butyl alcohol bath was exchanged for fresh tertiary butyl alcohol. The soak and exchange process was repeated three times. The part was subsequently frozen on a shelf freezer and subjected to subcritical drying for 96 hours at 5° C., followed by drying in vacuum at 50° C. for 48 hours. The final recovered aerogel part had an open-cell structure as observed by scanning electron microscopy (SEM) performed on a Phenom Pro Scanning Electron Microscope (Phenom-World, the Netherlands) and exhibited a density of 0.23 g/cm$^3$ and porosity of 82.7% as measured according to ASTM D4404-10 with a Micromeritics® AutoPore V 9605 Automatic Mercury Penetrometer (Micromeritics® Instrument Corporation, U.S.A.). The distribution of pore sizes was measured according to ASTM D4404-10 using a Micromeritics® AutoPore V 9605 Automatic Mercury Penetrometer (Micromeritics® Instrument Corporation, U.S.A.), and the distribution of pore diameters is shown in FIG. 8. From the data, it was determined that 90.6% of the aerogel's pore volume was made up of pores having an average pore diameter of greater than 50 nm.

Example 8

Preparation of a Highly Branched Polyamic Film

A reaction vessel with a mechanical stirrer and a water jacket was employed. The flow of the water through the reaction vessel jacket was adjusted to maintain temperature in the range of 20-28° C. The reaction vessel was charged with DMSO (108.2 lbs. 49.1 kg), and the mechanical stirrer speed was adjusted to 120-135 rpm. TAPOB (65.03 g) was added to the solvent. To the solution was added DMB (1,080.96 g), followed by ODA (1,018.73 g). A first portion of BPDA (1,524.71 g) was added. After stirring for 20 minutes, a sample of the reaction mixture was analyzed for viscosity. A second portion of BPDA (1,420.97 g) was added, and the reaction mixture was stirred for 20 additional minutes. A sample of the reaction mixture was analyzed for viscosity. A third portion of BPDA (42.81 g) was added, and the reaction mixture was stirred for 20 additional minutes. A sample of the reaction mixture was analyzed for viscosity. After stirring for 8 hours, PA (77.62 g) was added. The resulting reaction mixture was stirred until no more solid was visible. After 2 hours, the resin was removed from the reaction vessel, filtered, and weighed.

The resin (10,000 grams) was mixed with 2-methylimidazole (250 grams) for five minutes. Benzoic anhydride (945 grams) was added, and the solution mixed an additional five minutes. After mixing, the resultant solution was poured onto a moving polyester substrate that was heated in an oven at 100° C. for 30 seconds. The gelled film was collected and placed into an acetone bath. After immersion for 24 hours, the acetone bath was exchanged for fresh acetone. The soak and exchange process was repeated six times. After the final exchange, the gelled film was removed. The acetone solvent was evaporated under a stream of air at room temperature and subsequently dried for 2 hours at 200° C. The final recovered aerogel part had an open-cell structure as observed by scanning electron microscopy (SEM) performed on a Phenom Pro Scanning Electron Microscope (Phenom-World, the Netherlands) and exhibited a density of 0.20 g/cm$^3$ and a porosity of >80% as measured according to ASTM D4404-10 with a Micromeritics® AutoPore V 9605 Automatic Mercury Penetrometer (Micromeritics® Instrument Corporation, U.S.A.). The final recovered film exhibited a tensile strength and elongation of 1200 psi (8.27 MPa) and 14%, respectively, at room temperature as measured according to ASTM D882-02. The film had an average pore size of 400 nm.

Example 9

(Polyimide Aerogel Film (Single and Multiple Layers) Laminated with Graphite

Laminate samples of 6 inches by 12 inches were assembled using polyimide aerogel film AeroZero® (Blueshift Materials, Inc. (Spencer, Massachusetts)), a silicone adhesive transfer tape of 2.0 mil thickness, and 4.0 mil thick N-100 NeoNxGen™ graphite film (NeoGraf Solutions, LLC, Lakewood, Ohio). For the single AeroZero® layer stack-up, one side of the release liner is removed from the silicone adhesive and placed onto the AeroZero® film. Pressure was applied using a hand roller. The release liner was peeled off from the other side of the adhesive and the graphite layer placed on top of it. Pressure was re-applied using a hand roller. For attachment of the laminate to a given substrate, an additional sheet of the silicone adhesive transfer tape was placed on the bare AeroZero® side.

For a multiple layer AeroZero® laminate, the assembly was built by stacking an additional sheet of silicone adhesive transfer tape onto the bare AeroZero® side, followed by an additional AeroZero® sheet on top, and repeated to add three layers of the AeroZero® before placement of the graphite layer.

The polyimide aerogel film AeroZero® (Blueshift Materials, Inc. (Spencer, Massachusetts)) had 6.5-mil thickness, and a thermal conductivity of 0.03 W/mK (measured using a Netzsch HEM 436/3/1E Lamda per ASTM C518-10, steady state steady state thermal transmission through flat slab specimens using a heat flow meter apparatus.

Example 10

(Polyimide Aerogel Film (Single and Multiple Layers) Laminated with Molybdenum

Laminate samples of 6 inches by 12 inches were assembled using polyimide aerogel film AeroZero® (Blueshift Materials, Inc. (Spencer, Massachusetts)) and 2.0-mil-thick Molybdenum Foil (Elmet Technologies, Lewiston, Maine, USA). For the single AeroZero® layer stack-up, one side of the release liner is removed from the silicone adhesive and placed onto the AeroZero® film. Pressure was applied using a hand roller. The release liner was peeled off from the other side of the adhesive and the molybdenum foil placed on top of it. Pressure was re-applied using a hand roller. For attachment of the laminate to a given substrate, an additional sheet of the silicone adhesive transfer tape was placed on the bare AeroZero® side.

For a multiple layer AeroZero® laminate, the assembly was built by stacking an additional sheet of silicone adhesive transfer tape onto the bare AeroZero® side, followed by an additional AeroZero® sheet on top, and repeated to add three layers of the AeroZero® before placement of the molybdenum layer.

The polyimide aerogel film AeroZero® (Blueshift Inc.) had 6.5-mil thickness, and a thermal conductivity of 0.03 W/mK (measured using a Netzsch 436/3/1E Lamda per ASTM C518-10, steady state steady state thermal transmission through flat slab specimens using a heat flow meter apparatus.

Example 11

(Polyimide Aerogel Film (Single and Multiple Layer) Laminated with Steel

Laminate samples of 6 inches by 12 inches were assembled using polyimide aerogel film AeroZero® (Blueshift Materials, Inc. (Spencer, Massachusetts)) and 2.0-mil-thick Stainless Steel 304 (McMaster-Carr, Douglassville, Georgia). For the single AeroZero® layer stack-up, one side of the release liner is removed from the silicone adhesive and placed onto the AeroZero® film. Pressure was applied using a hand roller. The release liner was peeled off from the other side of the adhesive and the steel sheet was placed on top of it. Pressure was re-applied using a hand roller. For attachment of the laminate to a given substrate, an additional sheet of the silicone adhesive transfer tape was placed on the bare AeroZero® side.

For a multiple layer AeroZero® laminate, the assembly was built by stacking an additional sheet of silicone adhesive transfer tape onto the bare AeroZero® side, followed by an additional AeroZero® sheet on top, and repeated to add three layers of the AeroZero® before placement of the steel layer.

The polyimide aerogel film AeroZero® (Blueshift Materials, Inc. (Spencer, Massachusetts)) had 6.5-mil thickness, and a thermal conductivity of 0.03 W/mK (measured using a Netzsch HFM 436/3/1E Lamda per ASTM C518-10, steady state steady state thermal transmission through flat slab specimens using a heat flow meter apparatus.

Example 12

(Polyimide Aerogel Film (Single Layer) Laminated with Tungsten

Laminate samples of 6 inches by 12 inches were assembled using polyimide aerogel film AeroZero® (Blueshift Materials, Inc. (Spencer, Massachusetts)) and 5.0-mil-thick Tungsten (Elmet Technologies, Lewiston, Maine, USA). For the single AeroZero® layer stack-up, one side of the release liner is removed from the silicone adhesive and placed onto the AeroZero® film. Pressure was applied using a hand roller. The release liner was peeled off from the other side of the adhesive and the Tungsten sheet was placed on top of it. Pressure was re-applied using a hand roller. For attachment of the laminate to a given substrate, an additional sheet of the silicone adhesive transfer tape was placed on the bare AeroZero® side.

The polyimide aerogel film AeroZero® (Blueshift Materials, Inc. (Spencer, Massachusetts)) had 6.5-mil thickness, and a thermal conductivity of 0.03 W/mK (measured using a Netzsch HFM 436/3/1E Lamda per ASTM C518-10, steady state steady state thermal transmission through flat slab specimens using a heat flow meter apparatus.

Example 13

(Polyimide Aerogel Film (Single Layer) Laminated with Niobium

Laminate samples of 6 inches by 12 inches were assembled using polyimide aerogel film AeroZero® (Blueshift Materials, Inc. (Spencer, Massachusetts)) and 2.0-mil-thick Niobium Foil (Fine Metals Corporation, Ashland, Virginia). For the single AeroZero® layer stack-up, one side of the release liner is removed from the silicone adhesive and placed onto the AeroZero® film. Pressure was applied using a hand roller. The release liner was peeled off from the other side of the adhesive and the Niobium sheet was placed on top of it. Pressure was re-applied using a hand roller. For attachment of the laminate to a given substrate, an additional sheet of the silicone adhesive transfer tape was placed on the bare AeroZero® side.

The polyimide aerogel film AeroZero® (Blueshift Materials, Inc. (Spencer, Massachusetts)) had 6.5-mil thickness, and a thermal conductivity of 0.03 W/mK (measured using a Netzsch HFM 436/3/1E Lamda per ASTM C518-10, steady state steady state thermal transmission through flat slab specimens using a heat flow meter apparatus.

Example 14

Peel Strength Testing of Laminates

Peel strength testing of single layer Aerozero laminates described in examples 10-13 was performed using the 180° peel strength test according to ASTM D3330 using a Testometric M250-2.5CT (Testometric, U.K.). The results are shown in Table 1.

TABLE 1

| AeroZero ® Laminate with: | Peel strength (gf/inch) |
|---|---|
| Graphite | Permanent bond (cannot quantify due to substrate failure |
| Molybdenum | 3800 |
| Steel | 2300 |
| Tungsten | Substrate too thick |
| Niobium | 2900 |

Example 15

Flame Testing of Graphite Laminates

Several laminates were prepared, each including three 6.5-mil-thick AeroZero® films (Blueshift Materials, Inc., Spencer, Massachusetts) for its heat-insulating layers, and about 4.0-mil-thick N-100 NeoNxGen™ (NeoGraf Solutions, LLC, Lakewood, Ohio) graphite layers for its heat-dispersing layers. In each laminate, the heat-dispersing layers defined the laminate's front and back faces, and the heat-dispersing and heat-insulating layers were joined to one another using silicone adhesive layers having thicknesses of about 2.0 mil. The laminates had widths and lengths of 6 inches.

For each of the laminates, the laminate's front face was exposed to the flame generated by a MAPP gas torch, which had a flame temperature of about 2,050° C., for 60 to 120 seconds. The laminates maintained mechanical integrity.

Example 16

Flame Testing of Molybdenum Laminates with Two Heat Dispersing Layers

Several laminates were prepared, each including three 6.5-mil-thick AeroZero® films (Blueshift Materials, Inc., Spencer, Massachusetts) for its heat-insulating layers, and about 2.0-mil-thick Molybdenum Foil (Elmet Technologies, Lewiston, Maine, USA) for its heat-dispersing layers. In each laminate, the heat-dispersing layers defined the laminate's front and back faces, and the heat-dispersing and heat-insulating layers were joined to one another using silicone adhesive layers having thicknesses of about 2.0 mil. The laminates had widths and lengths of 6 inches.

For each of the laminates, the laminate's front face was exposed to the flame generated by a MAPP gas torch, which had a flame temperature of about 2,050° C., for 60 to 120 seconds. The laminates maintained mechanical integrity during testing.

Example 17

Flame Testing of Molybdenum Laminates with One Heat Dispersing Layers

Several laminates were prepared, each including three 6.5-mil-thick AeroZero® films (Blueshift Materials, Inc., Spencer, Massachusetts) for its heat-insulating layers, and about 2.0-mil-thick Molybdenum Foil (Elmet Technologies, Lewiston, Maine, USA) for its heat-dispersing layer. In each laminate, the heat-dispersing layer defined the laminate's front face only, and the heat-dispersing and heat-insulating layers were joined to one another using silicone adhesive layers having thicknesses of about 2.0 mil. The laminates had widths and lengths of 6 inches.

For each of the laminates, the laminate's front face was exposed to the flame generated by a MAPP gas torch, which had a flame temperature of about 2,050° C., for 60 to 120 seconds. The laminates maintained mechanical integrity during testing.

The above specification and examples provide a complete description of the structure and use of illustrative embodiments. Although certain embodiments have been described above with a certain degree of particularity, or with reference to one or more individual embodiments, those of ordinary skill in the art could make numerous alterations to the disclosed embodiments without departing from the scope of this invention. As such, the various illustrative embodiments of the apparatuses and methods are not intended to be limited to the particular forms disclosed. Rather, they include all modifications and alternatives falling within the scope of the claims, and embodiments other than the ones shown may include some or all of the features of the depicted embodiments. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

The claims are not intended to include, and should not be interpreted to include, means plus- or step-plus-function limitations, unless such a limitation is explicitly recited in a given claim using the phrase(s) "means for" or "step for," respectively.

The invention claimed is:

1. An apparatus comprising:

a laminate including:

a front surface;

a back surface;

a heat-dispersing layer comprising at least 90% by weight of:

a metal having:

a melting point of at least 1,300° C.; and a thermal conductivity of at least 15 W/Km; or graphite;

a first heat-insulating layer having a thickness of 3 mil to 7 mil, wherein the heat-insulating layer comprises at least 90% by weight of a porous polyimide aerogel having a thermal conductivity of 0.03 W/m K to 0.5 W/m K and pores having an average pore diameter of 150 nm to 1200 nm;

a first adhesive layer attached to the heat-dispersing layer and the heat-insulating layer; and a second adhesive layer attached to the heat-insulating layer, wherein:

at least a majority of the front surface of the laminate is defined by the heat-dispersing layer;

at least a majority of the back surface of the laminate is defined by the second adhesive layer, and a thickness of the laminate is between 6 mils and 75 mils.

2. The apparatus of claim 1, wherein the heat-dispersing layer is at least 90% by weight of the metal.

3. The apparatus of claim 2, wherein the metal is molybdenum, tungsten, rhenium, tantalum, niobium, stainless steel, or an alloy thereof.

4. The apparatus of claim 2, wherein the melting point of the metal is at least 1,600° C.

5. The apparatus of claim 2, wherein the melting point of the metal is less than 3,800° C.

6. The apparatus of claim 2, wherein the thermal conductivity of the metal is less than 200 W/Km.

7. The apparatus of claim 1, wherein the heat-dispersing layer is at least 90% by weight of graphite.

8. The apparatus of claim 1, wherein the heat-dispersing layer has a thickness that is between 1.0 and 10.0 mils.

9. The apparatus of claim 1, wherein the polyimide aerogel comprises micropores, mesopores, or macropores.

10. The apparatus of claim 9, wherein the polyimide aerogel has a pore volume; and at least 10% of the pore volume is made up of the macropores.

11. The apparatus of claim 1, wherein the average pore diameter of the aerogel is between 150 nm and 800 nm.

12. The apparatus of claim 1, wherein aerogel is at least 90% by weight of the polyimide.

13. The apparatus of claim 1, wherein the first adhesive layer and the second adhesive layer are a silicone composition.

14. The apparatus of claim 13, wherein the silicone is polydimethyl silicone or biphenyl silicone.

15. The apparatus of claim 1, wherein the heat-dispersing layer is the only heat-dispersing layer of the laminate.

16. The apparatus of claim 1, wherein the laminate does not comprise fibers or a ceramic.

17. The apparatus of claim 1, wherein the laminate has a thickness that is between 6.0 mils and 150 mils.

18. The apparatus of claim 1, wherein the laminate is disposed in a roll such that a portion of the front surface of the laminate comprising the heat-dispersing layer faces a portion of the back surface of the laminate.

19. The apparatus of claim 1, wherein the laminate can maintain mechanical integrity when exposed to a temperature of at least 800° C. for a time period of at least 30 s, at least 1 min, at least 1.5 min, or at least 2 min.

20. The apparatus of claim 1, further comprising a second heat-insulating layer and a third heat-insulating layer, wherein the second and third heat-insulating layers are positioned between the first heat-insulating layer and the second adhesive layer.

21. The apparatus of claim 20, wherein the third heat-insulating layer is adhesively attached to the first heat-insulating layer and the second heat-insulating layer.

22. The apparatus of claim 20, wherein the first heat-insulating layer, the second heat-insulating layer, and the third heat insulating layer each have a thickness of 6 mils to 800 mils.

23. The apparatus of claim 1, wherein the back surface of the laminate is attached to a surface of an aircraft, spacecraft, missile, or rocket, and wherein the front surface of the laminate is an outermost surface of the aircraft, spacecraft, missile, or rocket.

24. A method comprising:

exposing the laminate of claim 1 to a temperature of at least 800° C. for a time period of at least 30 s;

wherein during the exposing, the laminate maintains mechanical integrity.

25. An apparatus comprising:

a laminate consisting of:

a front surface;

a back surface;

a heat-dispersing layer consisting of at least 90% by weight of:

a metal having:

a melting point of at least 1,300° C.; and a thermal conductivity of at least 15 W/Km; or graphite; and a heat-insulating layer having a thickness of 3 mil to 7 mil, wherein the heat-insulating layer consists of at least 90% by weight of a porous polyimide aerogel having a thermal conductivity of 0.03 W/m K to 0.5 W/m K and pores having an average pore diameter of 150 nm to 1200 nm;

a first adhesive layer attached to the heat-dispersing layer and the heat-insulating layer;

a second adhesive layer attached to the heat-insulating layer, wherein:

at least a majority of the front surface of the laminate is defined by the heat-dispersing layer;

at least a majority of the back surface of the laminate is defined by the second adhesive layer, and a thickness of the laminate is between 6 mils and 75 mils.

* * * * *